United States Patent
Kunieda et al.

(10) Patent No.: US 10,943,376 B2
(45) Date of Patent: Mar. 9, 2021

(54) IMAGE PROCESSING APPARATUS FOR LAYING OUT IMAGE ON TEMPLATE AND IMAGE PROCESSING METHOD

(71) Applicant: CANON KABUSHIKI KAISHA, Tokyo (JP)

(72) Inventors: Hiroyasu Kunieda, Yokohama (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 451 days.

(21) Appl. No.: 15/882,912

(22) Filed: Jan. 29, 2018

(65) Prior Publication Data

US 2018/0218527 A1   Aug. 2, 2018

(30) Foreign Application Priority Data

Jan. 31, 2017 (JP) .............................. JP2017-016209

(51) Int. Cl.
  *G06T 11/60* (2006.01)
  *G06K 9/62* (2006.01)
  (Continued)

(52) U.S. Cl.
  CPC .......... *G06T 11/60* (2013.01); *G06K 9/00221* (2013.01); *G06K 9/00684* (2013.01);
  (Continued)

(58) Field of Classification Search
  CPC .............. G06F 16/958; H04N 1/00196; H04N 1/00132; H04N 2201/3253;
  (Continued)

(56) References Cited

U.S. PATENT DOCUMENTS

2008/0062282 A1 * 3/2008 Shiimori ................. G06F 16/58
                                                  348/231.99
2008/0089561 A1 * 4/2008 Zhang ..................... G06K 9/623
                                                  382/118
(Continued)

FOREIGN PATENT DOCUMENTS

EP          0990996 A2    4/2000
JP       2007-318461 A   12/2007
(Continued)

OTHER PUBLICATIONS

Li, et al., "Automatic summarization for personal digital photos", ICICS-PCM, pp. 1536-1540, XP010701781, XP010701781, Dec. 2003.
Obrador, et al. "Automatic image selection by means of a hierarchical scalable collection representation", SPIE-IS&T/ vol. 7257, pp. 72570W-1 to 72570W-12, XP030081740, Jan. 2009.

*Primary Examiner* — Kim Y Vu
*Assistant Examiner* — Michael J Vanchy, Jr.
(74) *Attorney, Agent, or Firm* — Canon U.S.A., Inc. IP Division

(57) ABSTRACT

There is provided a technique for dividing a plurality of images into a plurality of image groups using a method which differs according to a predetermined condition. An image processing apparatus divides the plurality of images into the plurality of image groups according to time information corresponding to the plurality of images which are candidates to be laid out on a template. Then, at least one image included in each of the plurality of image groups is laid out on the template corresponding to each of the plurality of image groups. In the dividing, the plurality of images is divided into the plurality of image groups by a method which differs according to the predetermined condition.

23 Claims, 15 Drawing Sheets

(51) Int. Cl.
     *G06K 9/00*          (2006.01)
     *H04N 1/32*         (2006.01)
     *H04N 1/00*         (2006.01)

(52) U.S. Cl.
     CPC ....... *G06K 9/00718* (2013.01); *G06K 9/6201* (2013.01); *G06K 9/6285* (2013.01); *H04N 1/00196* (2013.01); *H04N 1/32128* (2013.01); *G06T 2200/24* (2013.01); *H04N 2201/3214* (2013.01); *H04N 2201/3215* (2013.01)

(58) Field of Classification Search
     CPC ........... H04N 1/00442; H04N 1/00456; H04N 1/00458; H04N 2201/3214; H04N 2201/3215; G06K 9/00677; G06K 9/6215; G06K 9/00684; G06K 9/00718
     See application file for complete search history.

(56) References Cited

U.S. PATENT DOCUMENTS

2011/0205399 A1*   8/2011   Gao ................... G06T 11/60
                                                348/231.99
2015/0169944 A1    6/2015   Gotohda et al.

FOREIGN PATENT DOCUMENTS

| JP | 2012244634 A | * 12/2012 | ............ G06F 16/58 |
| JP | 2012244634 A | 12/2012 | |
| WO | 2004/055696 A2 | 7/2004 | |
| WO | 2007/046534 A1 | 4/2007 | |

* cited by examiner

FIG. 5

| IMAGE CAPTURING TIME/DATE | FOCUS | NUMBER OF FACES | PERSONAL ID | | | | | | | OBJECT |
| --- | --- | --- | --- | --- | --- | --- | --- | --- | --- | --- |
| | | | 1 | | 2 | | 3 | | ... | |
| | | | UPPER LEFT POSITION | LOWER RIGHT POSITION | UPPER LEFT POSITION | LOWER RIGHT POSITION | UPPER LEFT POSITION | LOWER RIGHT POSITION | | |
| 2015/7/1 10h11m12s | GOOD | 6 | 40, 40 | 65, 65 | 90, 40 | 115, 65 | 10, 20 | 25, 35 | ... | — |
| 2015/7/1 10h12m30s | GOOD | 2 | 50, 100 | 100, 150 | 150, 125 | 190, 165 | 150, 125 | 190, 165 | ... | FLOWER |
| 2015/7/1 10h15m54s | GOOD | 0 | — | — | — | — | — | — | ... | DOG |
| ... | ... | ... | ... | ... | ... | ... | ... | ... | ... | ... |

FIG.7

| SCENE | IMAGE CAPTURING PERIOD (TIME) | | NUMBER OF CAPTURED IMAGES | | NUMBER OF CAPTURED PERSONS | |
|---|---|---|---|---|---|---|
| | MEAN VALUE | STANDARD DEVIATION | MEAN VALUE | STANDARD DEVIATION | MEAN VALUE | STANDARD DEVIATION |
| TRIP | 33.221 | 4.778 | 324.857 | 393.691 | 1.506 | 0.256 |
| USUAL SCENE | 3.336 | 4.671 | 54.892 | 108.805 | 1.465 | 0.974 |
| CEREMONY | 4.634 | 1.532 | 165.457 | 71.055 | 2.547 | 0.527 |

FIG.8A

| SCENE | FEATURE OF IMAGE IN MAIN SLOT | FEATURE OF IMAGE IN SUB-SLOT |
|---|---|---|
| TRIP | ZOOMED-OUT IMAGE INCLUDING PERSON AND LANDSCAPE | IMAGE OF CLOSE-UP OR SIDE FACE |
| USUAL SCENE | IMAGE OF CLOSE-UP OR SIDE FACE | ZOOMED-OUT IMAGE INCLUDING PERSON AND LANDSCAPE |
| CEREMONY | IMAGE IN WHICH DISTANCE BETWEEN TWO PERSONS IS SMALL | IMAGE OF MANY PERSONS |

FIG.8B

| IMAGE ID | SCORE (OUT OF 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

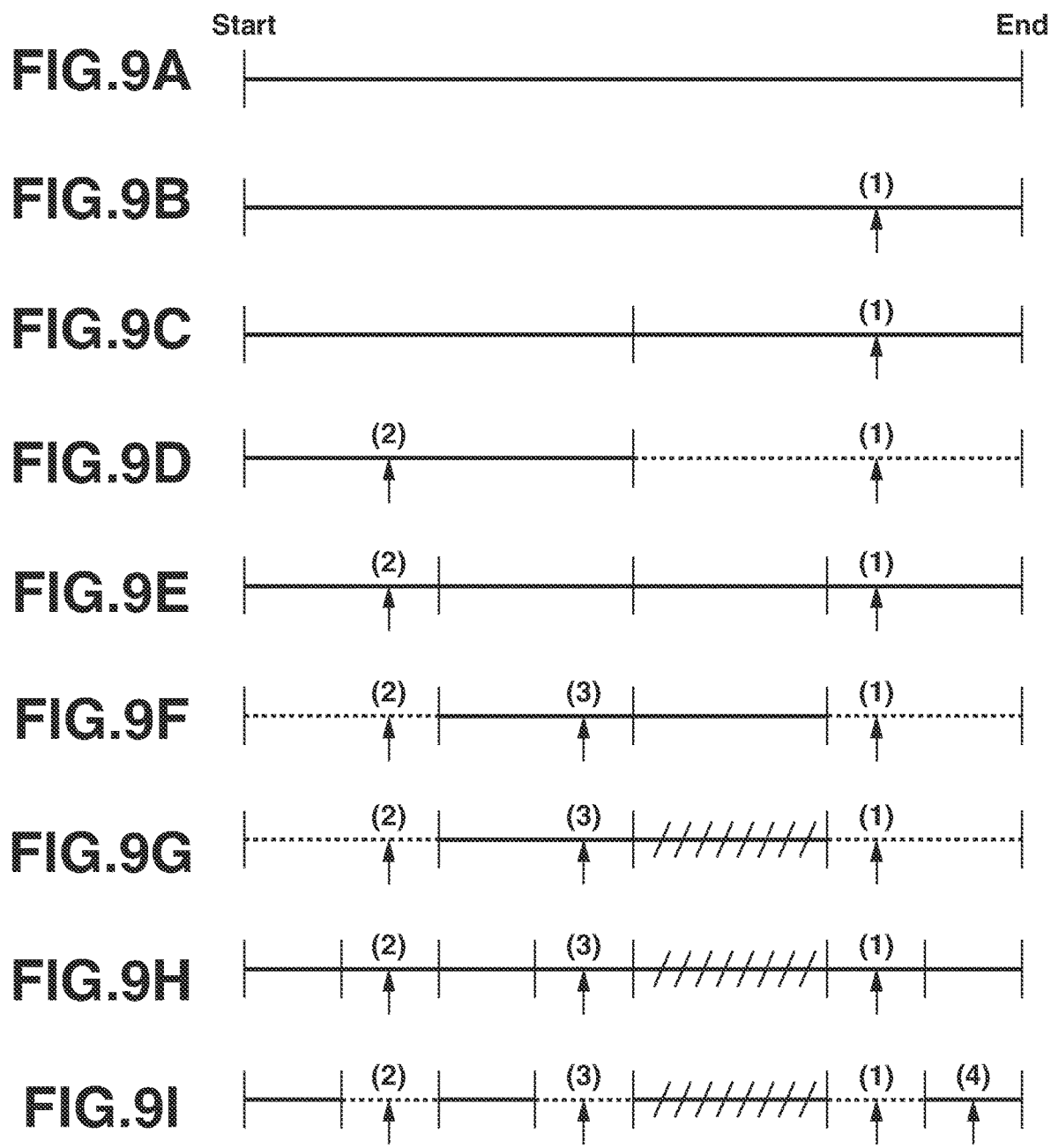

1002 1001 1003
1004

1006  1007  1005

TIME AND DATE

FIG. 12A

| SCENE ID | SCENE INFORMATION ||||| DELETION TARGET | SCENE COMBINATION ID |
|---|---|---|---|---|---|---|---|
| | NUMBER OF IMAGES | NUMBER OF OBJECTS | IMPORTANCE LEVEL | TIME PERIOD | TIME DIFFERENCE | | |
| 1 | 114 | 100 | 233 | 10hours:57minutes:54seconds | 7days:22hours:43minutes:54seconds | | 1 |
| 2 | 3 | 3 | 9 | 25seconds | 20hours:47minutes:21seconds | | 2 |
| 3 | 63 | 35 | 30 | 4hours:6minutes:20seconds | 10days:21hours:58minutes:36seconds | | 2 |
| 4 | 76 | 55 | 115 | 44minutes:38seconds | 12days:14hours:53minutes:26seconds | | 3 |
| 5 | 913 | 233 | 404 | 4days:7hours:22minutes:22seconds | 10days:18hours:33minutes:43seconds | | 4 |
| 6 | 13 | 13 | 26 | 3hours:1minute:27seconds | 15hours:12minutes:8seconds | | 5 |
| 7 | 15 | 10 | 23 | 2hours:10minutes:39seconds | 1day:10hours:55minutes:1second | | 6 |
| 8 | 3 | 3 | 4 | 14seconds | 20days:16hours:14minutes:44seconds | | 6 |
| 9 | 75 | 54 | 75 | 4hours:11minutes:11seconds | 19days:19hours:22minutes:39seconds | | 7 |
| 10 | 14 | 4 | 6 | 3hours:19minutes:5seconds | 2days:15hours:57minutes:21seconds | | 7 |
| 11 | 1 | 0 | 0 | 0seconds | 18days:4hours:2minutes:10seconds | * | - |
| 12 | 152 | 56 | 33 | 4hours:8minutes:15seconds | 5days:22hours:11minutes:48seconds | | 8 |
| 13 | 123 | 43 | 22 | 2hours:19minutes:58seconds | 20days:18hours:55minutes:15seconds | | 9 |
| 14 | 141 | 64 | 88 | 4hours:52minutes:13seconds | 0seconds | | 10 |

FIG. 12B

| SCENE ID | SCENE INFORMATION ||||| DELETION TARGET | SCENE COMBINATION ID |
|---|---|---|---|---|---|---|---|
| | NUMBER OF IMAGES | NUMBER OF OBJECTS | IMPORTANCE LEVEL | TIME PERIOD | TIME DIFFERENCE | | |
| 1 | 114 | 100 | 233 | 10hours:57minutes:54seconds | 7days:22hours:43minutes:54seconds | | |
| 2 | 66 | 38 | 39 | 4hours:6minutes:45seconds | 10days:21hours:58minutes:36seconds | | |
| 3 | 76 | 55 | 115 | 44minutes:38seconds | 12days:14hours:53minutes:26seconds | | |
| 4 | 913 | 233 | 404 | 4days:7hours:22minutes:22seconds | 10days:18hours:33minutes:43seconds | | |
| 5 | 13 | 13 | 26 | 3hours:1minute:27seconds | 15hours:12minutes:8seconds | | |
| 6 | 18 | 13 | 27 | 2hours:10minutes:53seconds | 20days:16hours:14minutes:44seconds | | |
| 7 | 75 | 54 | 75 | 7hours:30minutes:16seconds | 2days:15hours:57minutes:21seconds | | |
| 8 | 152 | 56 | 33 | 4hours:8minutes:15seconds | 5days:22hours:11minutes:48seconds | | |
| 9 | 123 | 43 | 22 | 2hours:19minutes:58seconds | 20days:18hours:55minutes:15seconds | | |
| 10 | 141 | 64 | 88 | 4hours:52minutes:13seconds | 0seconds | | |

FIG. 12C

| SCENE ID | NUMBER OF IMAGES | NUMBER OF OBJECTS | IMPORTANCE LEVEL | SCENE INFORMATION ||| DELETION TARGET | SCENE COMBINATION ID |
|---|---|---|---|---|---|---|---|---|
| | | | | TIME PERIOD | TIME DIFFERENCE | | | |
| 1 | 114 | 100 | 304 | 10hours:57minutes:54seconds | 7days:22hours:43minutes:54seconds | | 1 |
| 2 | 3 | 3 | 23 | 25seconds | 20hours:47minutes:21seconds | | 2 |
| 3 | 63 | 35 | 324 | 4hours:6minutes:20seconds | 10days:21hours:58minutes:38seconds | | 2 |
| 4 | 76 | 55 | 378 | 44minutes:38seconds | 12days:14hours:53minutes:26seconds | | 3 |
| 5 | 913 | 233 | 1171 | 4days:7hours:22minutes:22seconds | 10days:18hours:33minutes:43seconds | | 4 |
| 6 | 13 | 13 | 28 | 3hours:1minute:27seconds | 15hours:12minutes:8seconds | | 5 |
| 7 | 15 | 10 | 49 | 2hours:10minutes:39seconds | 1day:10hours:55minutes:1second | | 5 |
| 8 | 3 | 3 | 499 | 14seconds | 20days:16hours:14minutes:44seconds | | 5 |
| 9 | 75 | 54 | 550 | 4hours:11minutes:11seconds | 19days:19hours:22minutes:39seconds | | 6 |
| 10 | 14 | 4 | 77 | 3hours:19minutes:5seconds | 2days:15hours:57minutes:21seconds | | 7 |
| 11 | 1 | 0 | 437 | 0seconds | 18days:4hours:2minutes:10seconds | | 7 |
| 12 | 152 | 56 | 298 | 4hours:8minutes:15seconds | 5days:22hours:11minutes:48seconds | | 8 |
| 13 | 123 | 43 | 669 | 2hours:19minutes:58seconds | 20days:18hours:55minutes:15seconds | | 9 |
| 14 | 141 | 64 | 141 | 4hours:52minutes:13seconds | 0seconds | | 10 |

FIG. 12D

| SCENE ID | NUMBER OF IMAGES | NUMBER OF OBJECTS | IMPORTANCE LEVEL | SCENE INFORMATION ||| DELETION TARGET | SCENE COMBINATION ID |
| --- | --- | --- | --- | --- | --- | --- | --- | --- |
| | | | | TIME PERIOD | TIME DIFFERENCE | | | |
| 1 | 114 | 100 | 304 | 10hours:57minutes:54seconds | 7days:22hours:43minutes:54seconds | | |
| 2 | 66 | 38 | 347 | 4hours:6minutes:45seconds | 10days:21hours:58minutes:36seconds | | |
| 3 | 76 | 55 | 378 | 44minutes:38seconds | 12days:14hours:53minutes:26seconds | | |
| 4 | 913 | 233 | 1171 | 4days:7hours:22minutes:22seconds | 10days:18hours:33minutes:43seconds | | |
| 5 | 31 | 26 | 576 | 5hours:12minutes:3seconds | 20days:16hours:14minutes:44seconds | | |
| 6 | 75 | 54 | 550 | 4hours:11minutes:11seconds | 19days:19hours:22minutes:39seconds | | |
| 7 | 15 | 4 | 514 | 3hours:19minutes:15seconds | 18days:4hours:2minutes:10seconds | | |
| 8 | 152 | 56 | 298 | 4hours:8minutes:15seconds | 5days:22hours:11minutes:48seconds | | |
| 9 | 123 | 43 | 669 | 2hours:19minutes:58seconds | 20days:18hours:55minutes:15seconds | | |
| 10 | 141 | 64 | 141 | 4hours:52minutes:13seconds | 0seconds | | |

IMAGE PROCESSING APPARATUS FOR LAYING OUT IMAGE ON TEMPLATE AND IMAGE PROCESSING METHOD

BACKGROUND OF THE INVENTION

Field of the Invention

The present invention relates to an image processing apparatus for laying out images on a template, and an image processing method.

Description of the Related Art

Images captured by image generation apparatuses such as digital cameras, digital video cameras, and scanners are output (displayed or printed) by various image output apparatuses such as monitors and printers. For example, there are cases in which a plurality of images is output as an electronic album. Such an electronic album is often output in double-page spread units with a plurality of images allocated to each double-page spread. For example, in a case of allocating images to a plurality of double-page spreads, if the images are arranged on the double-page spreads simply in a way that follows the order in which the images are captured, the images on each double-page spread can lack sense of unity. Japanese Patent Application Laid-Open No. 2007-318461 discusses a method for separating images by time unit such as day or month.

Variations in image capturing periods and features of a plurality of images can differ between a case where the plurality of images is large in number and a case where the plurality of images is small in number.

Thus, in the case of separating a plurality of images into a plurality of image groups as discussed in Japanese Patent Application Laid-Open No. 2007-318461, if the plurality of images is separated into the image groups by the same method regardless of the number of layout target candidate images, the plurality of images may not be separated into the plurality of image groups as appropriate.

SUMMARY OF THE INVENTION

The present invention is directed to a technique for determining a plurality of image groups using different processes corresponding to the number of images that are layout target candidates.

According to an aspect of the present disclosure, an image processing method includes dividing a plurality of images into a plurality of image groups according to time information corresponding to the plurality of images, the plurality of images being a candidate to be laid out on a template, and laying out at least one image included in each of the plurality of divided image groups on the template corresponding to each of the plurality of divided image groups, wherein in the dividing, a predetermined first method in which the dividing is executed based on a predetermined feature of the images included in the plurality of images in addition to the time information or a predetermined second method in which a weight of the predetermined feature in the dividing is lower than a weight in the predetermined first method is selected based on a predetermined condition as a method of dividing the plurality of images into the plurality of image groups, and wherein the dividing is executed by the selected division method.

Further features of the present disclosure will become apparent from the following description of exemplary embodiments with reference to the attached drawings.

BRIEF DESCRIPTION OF THE DRAWINGS

FIG. 5 illustrates image analysis information.

FIG. 7 is a table illustrating mean values and standard deviations of each scene.

FIGS. 8A and 8B are a table illustrating a concept of scoring axis.

FIGS. 9A to 9I illustrate image data selection.

FIGS. 12A to 12D are tables illustrating scene information about each scene.

DESCRIPTION OF THE EMBODIMENTS

Figure 1:
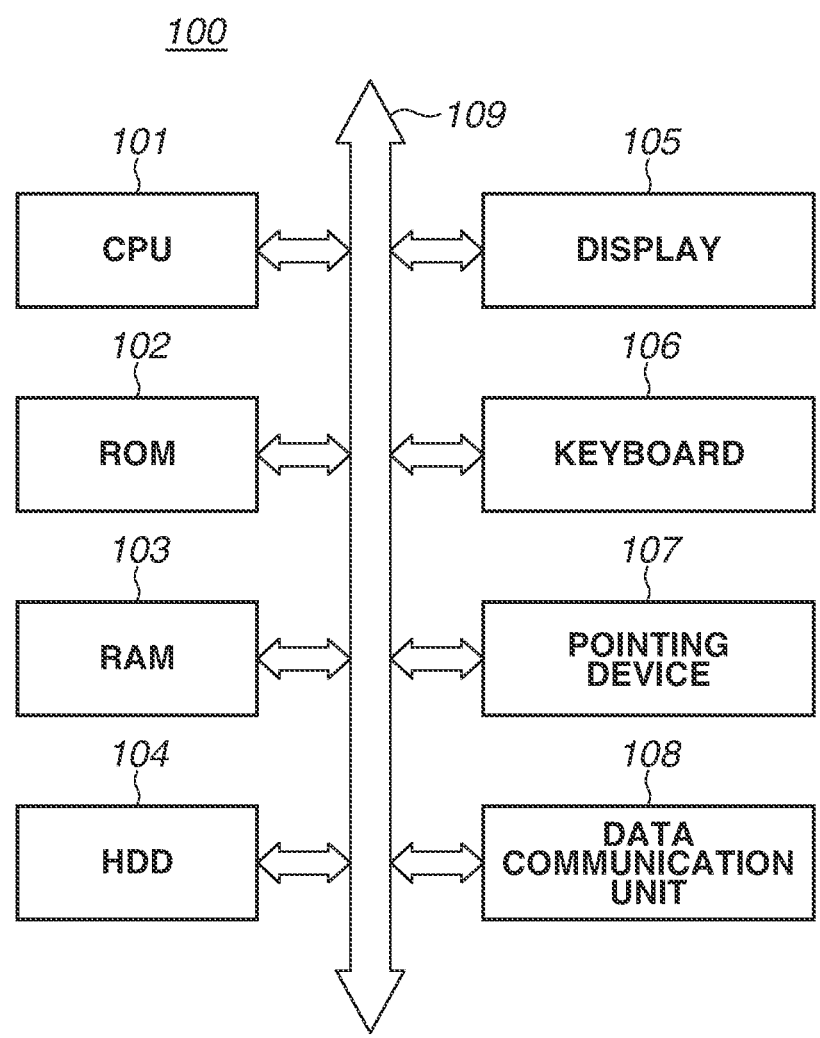
FIG. 1 is a block diagram illustrating a configuration of hardware of an image processing apparatus.

Various exemplary embodiments of the present invention will be described in detail below with reference to the drawings. It should be noted that the exemplary embodiments described below are not intended to limit the scope of the claimed invention and not every combination of features described in the exemplary embodiments below is always essential to a technical solution of the invention. Similar components are given the same reference numerals, and description thereof is omitted.

In a first exemplary embodiment, a process of causing an album creation application to operate on an image processing apparatus and generating a layout using an automatic layout function will be described.

FIG. 1 is a block diagram illustrating a configuration of hardware of the image processing apparatus. Examples of image processing apparatuses include a personal computer (PC) and a smartphone. In the present exemplary embodiment, a PC is used as the image processing apparatus. A central processing unit (CPU) 101 comprehensively controls an image processing apparatus 100 and, for example, reads a program stored on a read-only memory (ROM) 102 onto a random-access memory (RAM) 103 and executes the program to realize operations of the present exemplary embodiment. While a single CPU is illustrated in FIG. 1, a plurality of CPUs can be used. The ROM 102 is a general-purpose ROM and, for example, stores the program to be executed by the CPU 101. The RAM 103 is a general-purpose RAM and, for example, is used as a working memory for temporarily storing various types of information when the CPU 101 executes the program. A hard disk drive (HDD) 104 is a storage medium (storage unit) for storing a database including image files and results of processing such as image analysis, templates for use by the album creation application, and the like.

A display 105 displays to the user a user interface (UI) of the present exemplary embodiment and an electronic album as an image layout result. A keyboard 106 and a pointing device 107 receive instruction operations from the user. The display 105 may include a touch sensor function. The keyboard 106, for example, is used by the user to input the number of double-page spreads of an album desired by the user to create, on the UI displayed on the display 105. The pointing device 107, for example, is used by the user to click on a button on the UI displayed on the display 105.

A data communication unit 108 performs communication with an external device via a wired network, or a wireless network. The data communication unit 108, for example, transmits data laid out by the automatic layout function to a printer or server capable of communicating with the image processing apparatus 100. A data bus 109 connects the blocks illustrated in FIG. 1 so that the blocks can communicate with each other.

The album creation application in the present exemplary embodiment is saved in the HDD 104 and is activated if the user double-clicks an icon of the application displayed on the display 105 using the pointing device 107 as described below.

Figure 2:
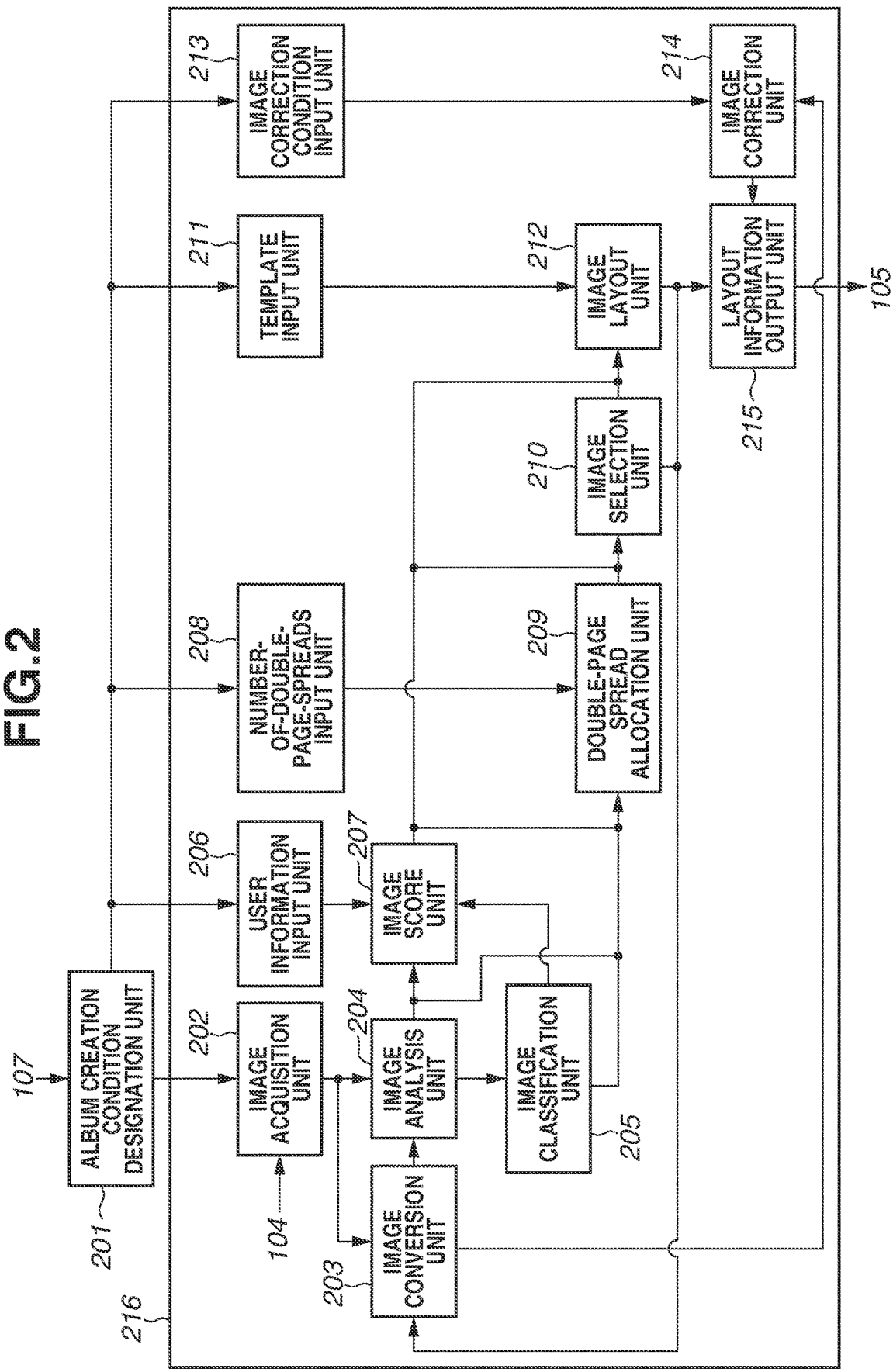
FIG. 2 is a software block diagram of an album creation application.

FIG. 2 is a software block diagram of the album creation application. Program modules respectively corresponding to the components of the configuration illustrated in FIG. 2 are included in the album creation application described above. Then, the CPU 101 executes the program modules to function as the components of the configuration illustrated in FIG. 2. Hereinafter, the components illustrated in FIG. 2 will be described as components that execute various types of processing. Further, FIG. 2 illustrates especially the software block diagram of an automatic layout processing unit 216 configured to execute the automatic layout function.

An album creation condition designation unit 201 determines an album creation condition according to an UI operation performed by the user using the pointing device 107, which will be described below, and outputs the determined album creation condition to the automatic layout processing unit 216.

An image acquisition unit 202 acquires from the HDD 104 an image data group designated by the album creation condition designation unit 201. An image conversion unit 203 converts image data for use in subsequent processing into image data with a desired number of pixels and color information. In the present exemplary embodiment, the image data is converted into analysis image data with the short side of 420 pixels and standard red, green, blue (sRGB) color information. An image analysis unit 204 executes feature amount acquisition, face detection, facial expression recognition, personal recognition, and object recognition, which will be described below, from the analysis image data. Further, the image analysis unit 204 executes acquisition of data accompanying the image data acquired from the HDD 104, for example, acquisition of image capturing date/time (time information) from exchangeable image file format (Exif) information. The time information is used in the division of a plurality of images into image groups, which will be described below. An image classification unit 205 executes scene division and scene classification, which will be described below, on the image data group using the image capturing date/time information, the number of captured images, detected face information, and the like. The term "scene" refers to an image capturing scene such as a trip, a usual scene, or a wedding ceremony. In the present exemplary embodiment, the plurality of images is divided into the plurality of image groups based on the time information. At this time, the plurality of images captured within a block of time is included in the same image group, so the plurality of images included in the same image group is considered as images captured in the same or similar image capturing scene.

An image score unit 207 scores each piece of image data so that images suitable for layout are given high scores. The image score unit 207 performs scoring using image analysis result information from the image analysis unit 204 and classification information from the image classification unit 205. This will be described below.

A user information input unit 206 inputs to the image score unit 207 an identification (ID) (identification information) of a subject person designated by the album creation condition designation unit 201. The image score unit 207 is configured to give a higher score to image data containing the subject person ID input from the user information input unit 206. Further, the user information input unit 206 inputs to the image score unit 207 a priority mode designated by the album creation condition designation unit 201. The image score unit 207 is configured to add a higher score to image data containing at least one or more objects input from the user information input unit 206.

A double-page spread allocation unit 209 divides a plurality of images into a plurality of image groups and allocates the plurality of divided image groups respectively to a plurality of double-page spreads of an album. A number-of-double-page-spreads input unit 208 inputs to the double-page spread allocation unit 209 the number of double-page spreads of the album designated by the album creation condition designation unit 201 and the priority mode designated by the user. The number of double-page spreads of the album corresponds to the number of templates, which is one or more than one, on which the plurality of images is to be arranged.

The double-page spread allocation unit 209 divides the plurality of images into the plurality of image groups based on the input number of double-page spreads and allocates some of or all the image groups to the double-page spreads. Further, the double-page spread allocation unit 209 divides or combines the plurality of image groups so that the number of image groups corresponds to the number of double-page spreads. In the present exemplary embodiment, the division of the plurality of image groups is also referred to as scene division, and the combination of the plurality of image groups is also referred to as scene combination. Further, in the present exemplary embodiment, the double-page spread allocation unit 209 divides or combines (scene division or scene combination) the plurality of image groups according to the priority mode designated by the user.

An image selection unit 210 selects images corresponding to the number of slots designated by the album creation condition designation unit 201 from each of the image groups respectively allocated to the double-page spreads by the double-page spread allocation unit 209 based on the scores given by the image score unit 207.

An image layout unit 212 determines an image data layout such as slots for laying out images and regions of images that are to be displayed in the slots. A template input unit 211 inputs to the image layout unit 212 a plurality of templates corresponding to template information designated by the album creation condition designation unit 201. The image layout unit 212 selects from the plurality of templates input from the template input unit 211 a template suitable for the images selected by the image selection unit 210 to determine a layout of the selected images. A layout information output unit 215 outputs layout information for the display on the display 105 according to the layout of the selected images which is determined by the laying out images unit 212. The layout information is, for example, bitmap data in which image data of the images selected by the image selection unit 210 is laid out on the selected template.

An image correction unit 214 executes various types of correction processing such as dodging correction (luminance correction), red-eye correction, and contrast correction. An image correction condition input unit 213 inputs to the image correction unit 214 an on/off condition of image correction designated by the album creation condition designation unit 201. If the image correction condition is on, the image correction unit 214 executes correction on image data. On the other hand, if the image correction condition is off, the image correction unit 214 does not execute correction on image data. The image correction unit 214 executes correction on image data input from the image conversion unit 203 based on whether the correction condition is on or off. The number of pixels of image data input from the image conversion unit 203 to the image correction unit 214 is changeable according to the size of the layout determined by the image layout unit 212.

When the album creation application is installed into the image processing apparatus 100, an activation icon is displayed on a top screen (desktop) of an operating system (OS) running on the image processing apparatus 100. If the user double-clicks the activation icon displayed on the display 105 with the pointing device 107, the program of the album creation application saved in the HDD 104 is loaded onto the ROM 102. The program loaded onto the ROM 102 is read into the RAM 103 and executed by the CPU 101 to activate the album creation application.

Figure 3:
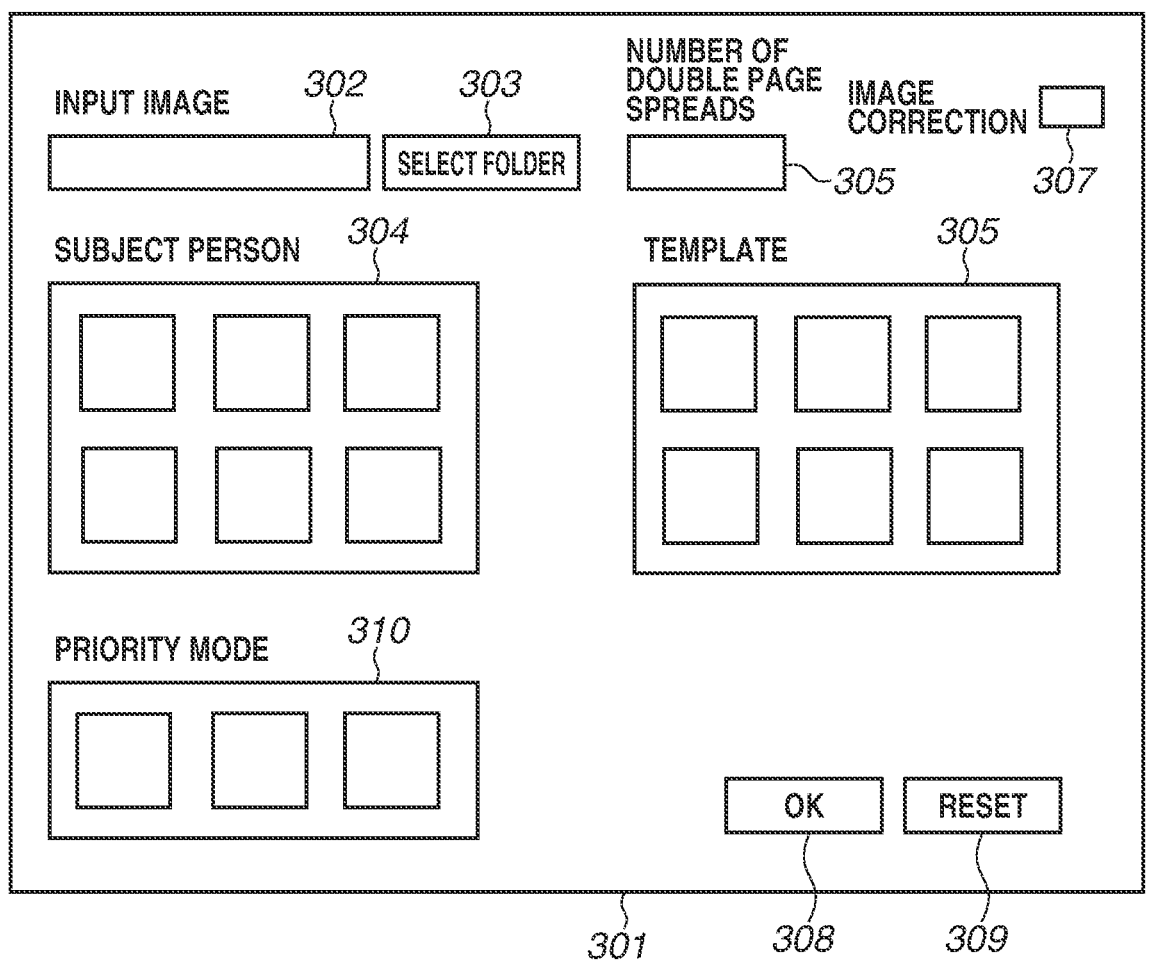
FIG. 3 illustrates a display screen provided by the album creation application.

FIG. 3 illustrates an example of a display screen 301 provided by the album creation application. The display screen 301 is displayed on the display 105. The user sets the album creation condition, which will be described below, via the display screen 301 and the album creation condition designation unit 201 acquires details of the user setting.

A path box 302 on the display screen 301 displays the storage locations (path) of the plurality of images (e.g., a plurality of image files), which is an album creation target, in the HDD 104. If a folder selection button 303 is clicked with the pointing device 107 by the user to give an instruction, a folder selection screen is displayed. On the folder selection screen, folders set in the HDD 104 are displayed in tree configuration, and the user can select with the pointing device 107 a folder containing the album creation target images. The folder path of the folder selected by the user is displayed in the path box 302.

A subject person designation icon 304 is an icon with which the user designates a subject person, and a face image of a person is displayed as the subject person designation icon 304. A plurality of icons of different face images is arranged and displayed in the subject person designation icon 304, and the user can select the icons by clicking on the icons with the pointing device 107. A number-of-double-page-spreads box 305 receives a setting of the number of double-page spreads of the album from the user. The user either directly inputs the number to the number-of-double-page-spreads box 305 via the keyboard 106 or inputs the number from a list to the number-of-double-page-spreads box 305 using the pointing device 107.

A template designation icon 306 displays illustration images by taste-by-taste basis (pop, chic, etc.) of the template. A plurality of template icons is arranged and displayed in the template designation icon 306, and the user can select the template icons by clicking on the template icons with the pointing device 107. A checkbox 307 receives designation of the on/off condition of image correction from the user. The state in which a check is entered in the checkbox 307 is the state in which image correction is set to on, whereas the state in which no check is entered in the checkbox 307 is the state in which image correction is set to off.

A priority mode designation icon 310 is an icon for designating a mode the user desires to prioritize (subject of a picture in the present exemplary embodiment), and icons of a person, a pet, and a flower are displayed. The user can select the priority mode designation icon 310 by clicking the priority mode designation icon 310 with the pointing device 107, and the priority mode designation icon 310 receives a user instruction regarding the type of an important object. More specifically, the user can designate the person, the pet, or the flower as the subject type to be prioritized as a layout target by clicking the priority mode designation icon 310.

Further, in the present exemplary embodiment, the plurality of image groups into which the plurality of images is divided is divided or combined so that the plurality of image groups corresponds to the number of double-page spreads. At this time, the plurality of image groups is divided or combined so that the subject of the type designated with the priority mode designation icon 310 is included in each of the divided or combined image groups. More specifically, the plurality of image groups is divided or combined so that the divided or combined image groups are prevented from not including the prioritized subject designated with the priority mode designation icon 310 and the prioritized subject is included in each of the image groups. Details thereof will be described below.

When an OK button 308 is pressed by the user, the album creation condition designation unit 201 acquires contents of the setting set on the display screen 301. The album creation condition designation unit 201 outputs the acquired contents of the setting to the automatic layout processing unit 216 of the album creation application. At this time, the path input to the path box 302 is transmitted to the image acquisition unit 202. A personal ID of the subject person selected at the subject person designation icon 304 and the priority mode designated at the priority mode designation icon 310 are transmitted to the user information input unit 206 and also to the image score unit 207. The number of double-page spreads input to the number-of-double-page-spreads box 305 and the priority mode designated at the priority mode designation icon 310 are transmitted to the number-of-double-page-spreads input unit 208 and also to the double-page spread allocation unit 209.

Template information selected at the template designation icon 306 is transmitted to the template input unit 211. The designation of the on/off condition of image correction at the checkbox 307 is transmitted to the image correction condition input unit 213. A reset button 309 on the display screen 301 is a button for resetting the setting information on the display screen 301.

Figure 4:
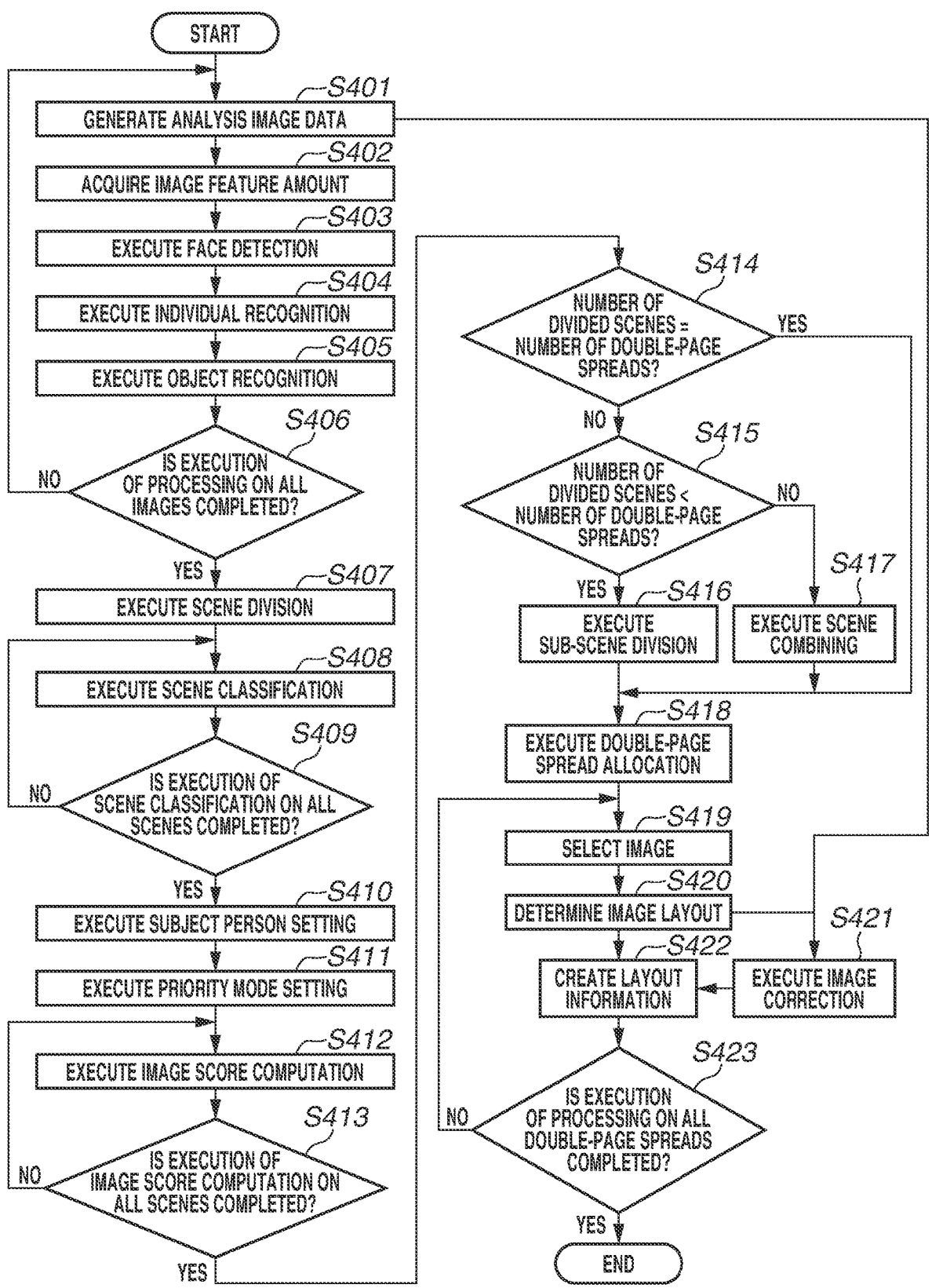
FIG. 4 is a flowchart illustrating an automatic layout process.

FIG. 4 is a flowchart illustrating a process executed by the automatic layout processing unit 216 of the album creation application. For example, the CPU 101 reads a program stored on the HDD 104 onto the ROM 102 or the RAM 103 and executes the program to realize the flowchart illustrated in FIG. 4. In the description of FIG. 4, the CPU 101 executes the album creation application so that the components of the configuration illustrated in FIG. 2 function and execute processing. The automatic layout process will be described below with reference to FIG. 4.

In step S401, the image conversion unit 203 generates analysis image data. More specifically, the image conversion unit 203 identifies a plurality of image files stored in folders in the HDD 104 and designated at the album creation condition designation unit 201, and the plurality of identified image files is read out from the HDD 104 to the RAM 103. Then, the image conversion unit 203 converts image data of the read image files into analysis image data containing the desired number of pixels and color information. In the present exemplary embodiment, the image conversion unit 203 converts image data into analysis image data having the short side of 420 pixels and containing sRGB color information.

In step S402, the image analysis unit 204 acquires an image feature amount. The image analysis unit 204 acquires the image capturing date/time as time information of the images contained in the image files read from the HDD 104 from, for example, Exif information accompanying the image files. Further, the image analysis unit 204 acquires a feature amount from the analysis image data generated in step S401. Examples of feature amounts include an in-focus level of a focus. To acquire the in-focus level of the focus, edge detection is performed. The Sobel filter is commonly known as an edge detection method. Edge detection is performed by the Sobel filter, and a difference in luminance between a start point and an end point of an edge is divided by the distance between the start point and the end point to calculate the gradient of the edge. From results of calculation of average gradients of edges in images, an image with a large average gradient can be considered as being more focused than an image with a small average gradient. Then, if a plurality of threshold values of different values is set to the gradients, in-focus degree evaluation values can be output by judging which one of the threshold values a gradient exceeds. In the present exemplary embodiment, two different threshold values are set in advance, and the in-focus degree is judged in three scales of "good", "average", and "poor". For example, a focus gradient that is desired to be employed for the album is judged "good", a focus gradient that is allowable is judged "average", and a focus gradient that is not allowable is judged "poor", and the threshold values are set in advance. For example, the setting of the threshold values can be provided by the creator of the album creation application, etc., or the threshold values can be settable on a user interface.

In step S403, the image analysis unit 204 executes face detection on the analysis image data generated in step S401. A publicly-known method can be used in the face detection processing, and, for example, Adaptive Boosting (AdaBoost) is used in which a strong classifier is generated from a plurality of weak classifiers. In the present exemplary embodiment, a strong classifier generated by AdaBoost detects a face image of a person (object). The image analysis unit 204 extracts a face image and acquires the upper left coordinate value and the lower right coordinate value of the position of the detected face images. Having the two types of coordinates, the image analysis unit 204 can acquire the position and size of the face image.

In step S404, the image analysis unit 204 executes personal recognition by comparing the face image detected in step S403 in the processing target image based on the analysis image data with representative face images saved for each personal ID in a face dictionary database. The image analysis unit 204 identifies from the plurality of representative face images a representative face image having the highest similarity to the face image in the processing target image which is not lower than a threshold value. Then, the personal ID corresponding to the identified representative face image is determined as an ID of the face image in the processing target image. If the similarity of every one of the plurality of representative face images to the face image in the processing target image is lower than the threshold value, the image analysis unit 204 registers in the face dictionary database the face image in the processing target image as a new representative face image in association with a new personal ID.

In step S405, the image analysis unit 204 executes object recognition on the analysis image data generated in step S401. In the object recognition processing, a publicly-known method can be used. In the present exemplary embodiment, a discriminator generated by the deep learning recognizes objects. The image analysis unit 204 can acquire the object type, such as a pet (dog or cat), flower, food, building, or stationary article, by recognizing the object images.

The image analysis unit 204 separates the image analysis information acquired in steps S402 to S405 for each ID identifying the respective images as illustrated in FIG. 5 and stores the image analysis information in a storage region such as the ROM 102. For example, as illustrated in FIG. 5, the image capturing date/time information and the focus judgement result acquired in step S402, the number of detected face images and the position information about the face images acquired in step S403, and the object type recognized in step S405 are stored in the form of a table. The position information about the face images is separated for each personal ID acquired in step S404 and stored. Further, if objects of a plurality of types are recognized from a single image, all the objects of the plurality of types are stored in the row corresponding to the single image in the table illustrated in FIG. 5.

In step S406, whether execution of steps S401 to S405 on all the images stored in the designated folder in the HDD 104 which is designated by the album creation condition designation unit 201 is completed is determined. If it is determined that execution of steps S401 to S405 on all the stored images is not completed (NO in step S406), step S401 and the subsequent steps are repeated. On the other hand, if it is determined that execution of steps S401 to S405 on all the stored images is completed (YES in step S406), the processing proceeds to step S407. In this way, repeated execution of steps S401 to S405 on all the images stored in the designated folder creates a table containing information about each of the images as illustrated in FIG. 5.

In step S407, the image classification unit 205 executes scene division for dividing all the images stored in the designated folder into a plurality of image groups based on the time information. In the division, the number of image groups does not have to coincide with the number of double-page spreads, and the division is provisional division processing for final division processing. The image classification unit 205 calculates a difference in image capturing time between the plurality of images stored in the designated folder based on the image capturing date/time information (time information) acquired in step S402. Then, the image classification unit 205 divides the plurality of images stored in the designated folder into the plurality of image groups (plurality of scenes) based on the difference in image capturing time.

Figure 6A:
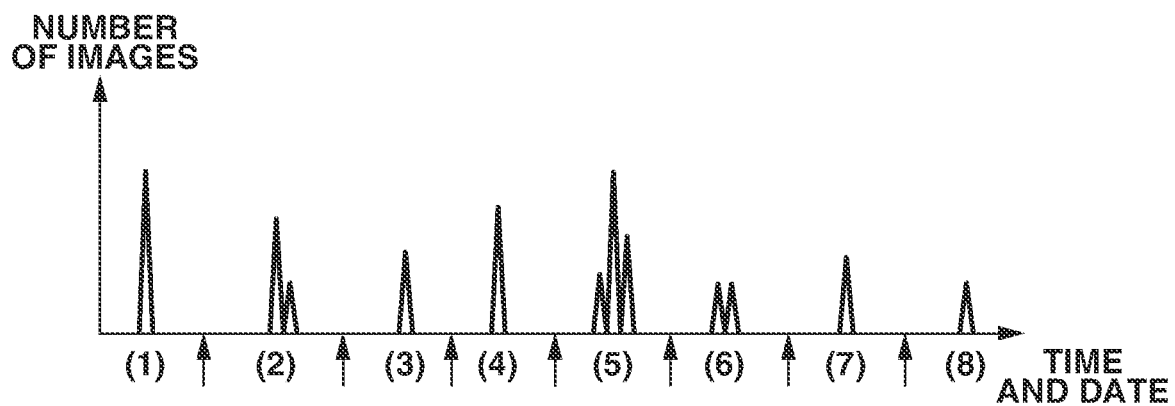
FIGS. 6A, 6B, and 6C illustrate a result of scene division of an image data group.

In the present exemplary embodiment, for example, the image classification unit 205 sorts the plurality of images stored in the designated folder in order of image capturing date/time and creates in the RAM 103 a list containing the names of the images (e.g., image file names) and the image capturing date/time. At this time, if image capturing dates corresponding to two consecutive images in the list are not consecutive, the image classification unit 205 allocates the two images to different image groups. Alternatively, the division to the image groups can be conducted based on any other criteria. For example, two consecutive images in the list can be allocated to different image groups even if the image capturing dates corresponding to the two images are consecutive. In this case, for example, if the difference in image capturing time between the two consecutive images in the list is 16 hours or longer, the two images are allocated to different image groups. Further, even if the difference in image capturing time between the two consecutive images in the list is less than 16 hours, if the time difference between the first image capturing time and the last image capturing time on each of two consecutive dates is less than 4 hours, the plurality of images captured on the two dates is divided to different image groups based on the dates. On the other hand, if the time difference between the first image capturing time and the last image capturing time on each of the two consecutive dates is not less than 4 hours, the division is executed based on the dates when the number of images captured on each date is less than 50, whereas the division is not executed when the number of images captured on each date is 50 or more. FIG. 6A illustrates an example of the result of division (scene division) of the plurality of images contained in the designated folder into the plurality of image groups by the scene division method described above. In FIG. 6A, the numbers (1) to (8) represent the respective image groups (scenes), the vertical axis represents the numbers of images of the respective image groups, and the horizontal axis represents the image capturing dates/times of the respective image groups.

In step S408, the image classification unit 205 executes scene classification. In the present exemplary embodiment, for example, the image classification unit 205 classifies the divided image data having undergone the scene division into one of the image capturing scenes of trip, usual scene, and ceremony. Prior to the start of the process illustrated in FIG. 4, the user collects and designates a plurality of pieces of image data judged as image data of the image capturing scene of trip, usual scene, or ceremony. The image classification unit 205 compares images associated with the respective scenes by the designation with images included in the image groups divided in step S407 to identify the types of the image capturing scenes corresponding to the respective image groups. The image capturing scene identification processing will be described below.

First, the designation of image data corresponding to the image capturing scenes by the user will be described below. For example, the album creation condition designation unit 201 receives designation of a plurality of pieces of image data judged as image data of the trip scene by the user on a user interface screen (not illustrated). Further, the image analysis unit 204 acquires feature amounts of the plurality of pieces of image data. Examples of feature amounts to be acquired include the image capturing period, the number of captured images, and the number of captured persons. The image capturing period is a time difference between the first image capturing and the last image capturing of the plurality of pieces of designated image data as described above. The number of captured images is the number of captured images of the plurality of pieces of images data. The number of captured persons is the number of captured faces. As a result, the image capturing period, the number of captured images, and the number of captured persons of one image data group including the plurality of pieces of image data judged as image data of the trip scene by the user are acquired as feature amounts.

Then, the image analysis unit 204 further executes the acquisition of the image capturing period, the number of captured images, and the number of captured persons as feature amounts as described above on the other image data groups designated by the user. Then, the image analysis unit 204 calculates the mean value and standard deviation of the image capturing periods, the mean value and standard deviation of the numbers of captured images, and the mean value and standard deviation of the numbers of captured persons, based on the feature amounts acquired from the plurality of image data groups. FIG. 7 illustrates the calculated mean values and the calculated standard deviations, and the image analysis unit 204 stores the values in advance in the storage region of the ROM 102. Alternatively, the values can be embedded in advance in the program of the album creation application.

The processing executed in step S408 in FIG. 4 is described again here. After the album creation application is activated, the image classification unit 205 calculates scores of the respective feature amounts of the image capturing period, the number of captured images, and the number of captured persons with respect to each division acquired by the scene division executed in step S407 on the image data group designated at the path box 302 by the user. The image classification unit 205 calculates the scores of the image capturing period, the number of captured images, and the number of captured persons for each division from formula (1) using the mean value and standard deviation of each scene illustrated in FIG. 7.

$$\text{Score}=50-|10\times(\text{mean value}-\text{feature amount})/\text{standard deviation}| \quad (1).$$

Further, an average score of the scores is calculated using formula (2).

$$\text{Average score}=(\text{score of the image capturing period}+\text{score of the number of captured images}+\text{score of the number of captured persons})/\text{the number of feature amount items} \quad (2).$$

As a result of calculations, the average score is calculated for each of the trip scene, usual scene, and ceremony scene with respect to the image data of each division. Then, the image classification unit 205 classifies the image data of the division into the scene that corresponds to the highest score. If the scenes are given the same score, the image data is classified according to priority order of the scenes determined in advance. For example, in the present exemplary embodiment, the priority order is determined as usual scene>ceremony>trip, and the highest priority is given to the usual scene. For example, regarding image group 5 in FIG. 6A on which scene division is executed, the image capturing period is 36 hours, the number of captured images is 300, and the number of captured persons is 1.7. The average scores of the trip scene, usual scene, and ceremony scene calculated using formulas (1) and (2) above are respectively 45.32, 18.38, and −29.92. Accordingly, image group 5 is classified into the trip scene. The image classification unit 205 gives the classified scene a scene ID so that the scene is identifiable, and manages the scene.

In step S409, whether execution of scene classification in step S408 on all the scenes divided in step S407 is completed is determined. If it is determined that execution of scene classification in step S408 on all the divided scenes is not completed (NO in step S409), step S408 and the subsequent steps are repeated. On the other hand, if it is determined that execution of scene classification in step S408 on all the divided scenes is completed (YES in step S409), the processing proceeds to step S410.

In step S410, the image score unit 207 executes subject person setting. The subject person setting is executed on the plurality of images contained in the folder designated by the user, and the subject person setting is executed using one of two types of setting methods of an automatic setting method and a manual setting method. In the manual setting method, the user selects a subject person by clicking with the pointing device 107 on the icon of the person displayed as the subject person designation icon 304 in FIG. 3. Further, the automatic setting method is executed as follows. The image score unit 207 can acquire the number of times the personal ID appears in the image data group, the number of times the personal ID appears in each scene, the number of scenes in which the personal ID appears, or the like from the result of personal recognition executed in step S404 and the result of scene division executed in step S406. The image score unit 207 automatically sets a subject person from the pieces of information instead of user designation. In the present exemplary embodiment, if there is a plurality of scenes, the image score unit 207 sets the personal ID that appears most frequently in the plurality of scenes, whereas if there is only a single scene, the image score unit 207 sets the personal ID that appears most frequently in the single scene.

Further, in a case where the subject person designation icon 304 is designated by the user, the user information input unit 206 transmits the designated personal ID to the image score unit 207. In a case where the personal ID is designated by the user, the image score unit 207 sets as the subject person ID the personal ID designated by the user instead of the automatically-set subject person ID described above. This setting is referred to as "manual setting".

In step S411, the image score unit 207 executes priority mode setting. The priority mode setting is executed on the plurality of images contained in the folder designated by the user, and one of two setting methods of an automatic setting method and a manual setting method is used. In the manual setting method, the user selects a desired priority mode (type of subject to be prioritized) by clicking the pointing device 107 on the person icon, the pet icon, or the flower icon displayed as the priority mode designation icon 310 in FIG. 3. The automatic setting method is executed as follows. The image score unit 207 acquires for each object type the number of times of appearance in the plurality of images based on the result of object recognition executed in step S405. Similarly, the image score unit 207 can acquire for each object type the number of times of appearance in each image group (scene). Further, the image score unit 207 can acquire for each object type the number of times of scenes in which an object of the object type appears. The image score unit 207 automatically sets the priority mode from the pieces of information instead of user designation. In the present exemplary embodiment, if there is a plurality of image groups (scenes), the image score unit 207 sets a mode to prioritize the object type that appears most frequently in the plurality of image groups. Further, if there is only a single image group (scene), the image score unit 207 sets a mode to prioritize the object type that appears most frequently in the single image group.

Figure 10A:
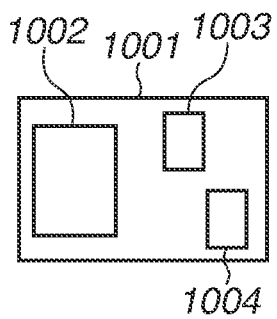
FIG. 10A to 10Q each illustrate a template group for use in image data layout.
Figure 10E:
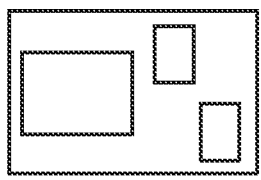
Figure 10I:
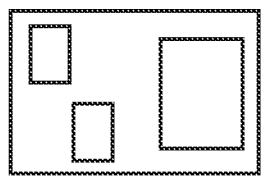
Figure 10M:
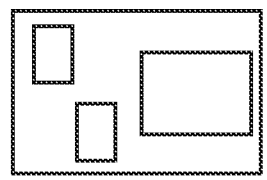
Figure 10B:
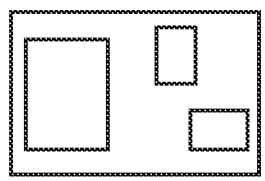
Figure 10F:
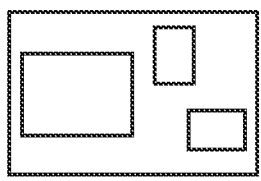
Figure 10J:
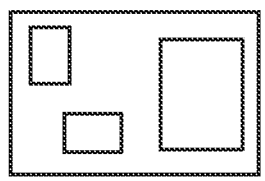
Figure 10N:
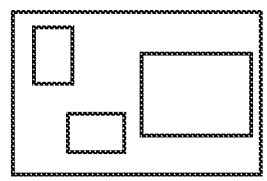
Figure 10C:
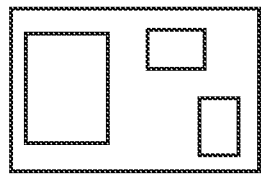
Figure 10G:
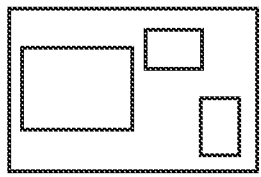
Figure 10K:
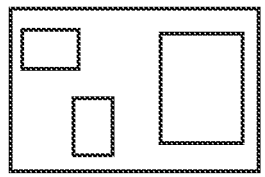
Figure 10O:
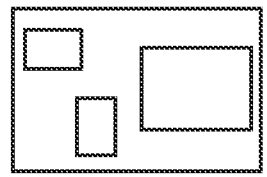
Figure 10D:
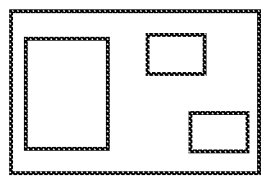
Figure 10H:
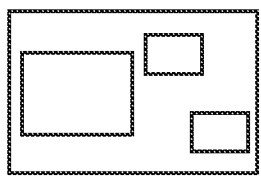
Figure 10L:
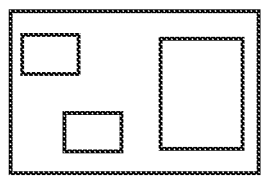
Figure 10P:
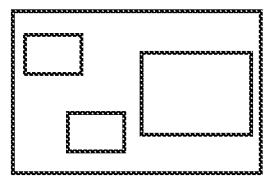
Figure 10Q:
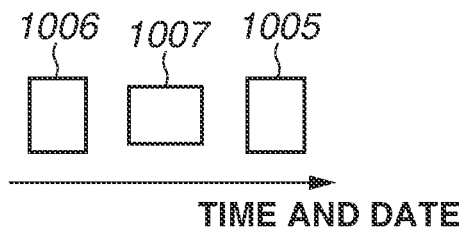

In step S412, the image score unit 207 executes score computation. The score computation is to give a score (to score) evaluated for each piece of image data from a viewpoint described below and is referred to in the selection of image data for use in layout, which will be described below. FIG. 10A to 10Q illustrates a template group for use in image data layout. A plurality of templates included in the template group each corresponds to a double-page spread. A template 1001 is a single template, and there are a main slot 1002 and sub-slots 1003 and 1004. The main slot 1002 is a main slot (frame in which an image is to be laid out) in the template 1001 and is larger in size than the sub-slots 1003 and 1004. The image score unit 207 gives scores for both the main slot and sub-slots to each piece of image data.

FIG. 8A illustrates features of images to be used in albums of the respective image capturing scenes of trip scene, usual scene, and ceremony scene, with respect to the main slot and the sub-slots. Prior to the start of the process illustrated in FIG. 4, the user collects and designates in advance a plurality of pieces of image data judged to match the features suitable for the main slot and sub-slots of the respective scenes illustrated in FIG. 8A. The image score unit 207 compares images associated with the main slot and sub-slots by the designation with images included in the image groups divided in step S407. By the comparison, score computation of the matching level of each of the images with respect to the main slot and sub-slots is conducted. The score computation processing will be described below.

First, the designation performed in advance by the user will be described below. For example, the album creation condition designation unit 201 receives designation of a plurality of pieces of image data judged suitable for the main slot (or suitable for the sub-slots) of the trip scene by the user on a user interface screen (not illustrated). The image analysis unit 204 acquires the number of faces, the positions of the faces, and the sizes of the faces in each piece of the designated image data as feature amounts. As a result, for example, the number of faces, the positions of the faces, and the sizes of the faces in each of the plurality of pieces of image data judged suitable for the main slot (or suitable for the sub-slots) of the trip scene by the user are acquired as feature amounts. Then, the image analysis unit 204 calculates the mean value and standard deviation of the number of faces, the mean value and standard deviation of the positions of the faces, and the mean value and standard deviation of the sizes of the faces. The image analysis unit 204 calculates the mean value and standard deviation as statistical values of each feature amount as described above with respect to each slot type (main slot and sub-slot) of each scene. The image analysis unit 204 stores the values in advance in the storage region such as the ROM 102. Alternatively, the values can be embedded in advance in the program of the album creation application.

The image score unit 207 can acquire information about the scene to which each piece of image data belongs from the result of scene classification executed in step S407. The image score unit 207 calculates scores from formula (3) below using the mean values and standard deviations calculated in advance and corresponding to the scene of image data of interest and the feature amounts of the number of faces, the positions of the faces, and the sizes of the faces, of the subject person ID of the image data of interest.

$$\text{Score}=50-|10\times(\text{mean value}-\text{feature amount})/\text{standard deviation}| \quad (3).$$

Further, an average score is calculated from formula (4).

$$\text{Average score}=(\text{score of the number of faces}+\text{score of the positions of the faces}+\text{score of the sizes of the faces})/\text{the number of feature amount items} \quad (4).$$

The image score unit 207 executes the score computation for both the main slot and sub-slots. Images to be used in albums are desirably in-focus state, so that a predetermined score can be added to image data of the image ID with the feature amount of the focus which is "good" in FIG. 5. FIG. 8B illustrates an example of a score result obtained by score computation described above, and score computation is executed for the main slot and sub-slots with respect to each image ID.

In this case, in the present exemplary embodiment, conditions suitable for the main slot and sub-slots are determined for each scene as illustrated in FIG. 8A, and the user designates in advance image data judged suitable for the main slot and sub-slots. The image analysis unit 204 acquires the feature amounts of the number of faces, the positions of the faces, and the sizes of the faces, with respect to the image data designated by the user and calculates the mean value and standard deviation for each feature amount. Then, after the album creation application is activated, if the automatic layout process illustrated in FIG. 4 is started, score computation (similarity) is executed which indicates how close each piece of image data (having undergone scene classification) which is a target of the automatic layout process is to user judgement criteria, such as suitability for the main slot. For example, in FIG. 8B, an image ID 1 is given 20 points for the main slot, and an image ID 2 is given 45 points for the main slot. This indicates that the image ID 2 is closer to the user judgement criteria for the main slot.

Referring back to FIG. 4, in step S413, the image score unit 207 determines whether execution of image score computation in step S412 on all the images contained in the folder designated by the user is completed. If the image score unit 207 determines that execution of image score computation in step S412 on all the images contained in the folder designated by the user is not completed (NO in step S413), step S412 and the subsequent steps are repeated. On the other hand, if the image score unit 207 determines that execution of image score computation in step S412 on all the images contained in the folder designated by the user is completed (YES in step S413), the processing proceeds to step S414.

In the present exemplary embodiment, the image layout unit 212 lays out the images contained in the plurality of scenes respectively on the plurality of templates (plurality of double-page spreads) respectively corresponding to the plurality of scenes. Thus, the number of the plurality of scenes needs to be the same as the number of the plurality of templates (predetermined number of double-page spreads).

Then, in step S414, the double-page spread allocation unit 209 determines whether the number of scenes divided in step S407 (number of divided image groups) is the same as the number of double-page spreads of the album input from the number-of-double-page-spreads input unit 208. If the double-page spread allocation unit 209 determines that the number of divided scenes is not the same as the input number of double-page spreads (NO in step S414), the processing proceeds to step S415. On the other hand, if the double-page spread allocation unit 209 determines that the number of divided scenes is the same as the input number of double-page spreads (YES in step S414), the processing proceeds to step S418. For example, if the number of divided scenes is eight and the number input from the number-of-double-page-spreads input unit 208 is also eight as illustrated in FIG. 6A, the processing proceeds to step S418.

In step S415, the double-page spread allocation unit 209 determines whether the number of scenes divided in step S407 is less than the number of double-page spreads (the number of templates used in the album) which is input from the number-of-double-page-spreads input unit 208. If the double-page spread allocation unit 209 determines that the number of divided scenes is not less than (is more than) the number of double-page spreads (NO in step S415), the processing proceeds to step S417. On the other hand, if the double-page spread allocation unit 209 determines that the number of divided scenes is less than the number of double-page spreads (YES in step S414), the processing proceeds to step S416. As illustrated in FIG. 6A, if the number of divided scenes is eight and the number input from the number-of-double-page-spreads input unit 208 is ten, the processing proceeds to step S416. In steps S416 and S417, the double-page spread allocation unit 209 executes processing on the plurality of image groups which undergoes the provisional division in step S407, which is illustrated in FIG. 6A, to change the number of divisions (the number of scenes) so that the number of scenes becomes the same as the number of double-page spreads. Details of the processing will be described below.

Figure 6B:
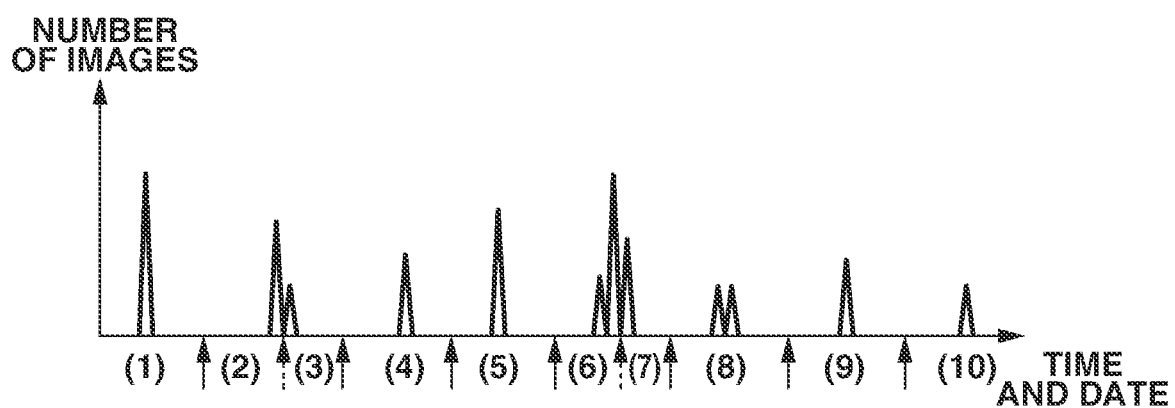

In step S416, the double-page spread allocation unit 209 executes sub-scene division. The sub-scene division refers to the further division of divided scenes when the number of divided scenes is less than the number of double-page spreads of the album. The case where the number of divided scenes is eight and the number of double-page spreads of the album designated is ten in FIG. 6A will be described below. FIG. 6B illustrates a result of execution of sub-scene division on the image groups illustrated in FIG. 6A. The division is executed at the portion specified by a dashed arrow to increase the number of divisions to ten.

Criteria for the division will be described below. The divisions in FIG. 6A are searched to find a division with a large number of images. In the present exemplary embodiment, two portions with a large number of images are determined to increase the number of divisions from eight to ten at the two portions. In FIG. 6A, the image group 5 has the largest number of images, and the image groups 1 and 2 have the second largest number of images. The image groups 1 and 2 have the same number of images, but the image group 2 has a larger time difference between the first image and the last image, so that the image group 2 is determined as a division target, and the image group 5 and the image group 2 are respectively divided.

First, the division of the image group 2 will be described below. The image group 2 has two peaks of the number of images, and the two peaks are different in image capturing date. Therefore, the image group 2 is divided at the portion corresponding to that part, which is specified by a dashed arrow in FIG. 6B. Next, the division of the image group 5 will be described below. The image group 5 has three peaks of the number of images is an image group captured three consecutive days. The image capturing date changes at two portions, but in order to reduce a difference in the number of images after the division, the image group 5 is divided at the portion specified by a dashed arrow in FIG. 6B. As described above, the number of divisions is increased from eight to ten. While the image groups are divided at the portions at which the image capturing date changes in the present exemplary embodiment, if a portion at which the number of images is large is a single date, the division can be executed at a portion with the largest time difference in the single date.

Figure 6C:
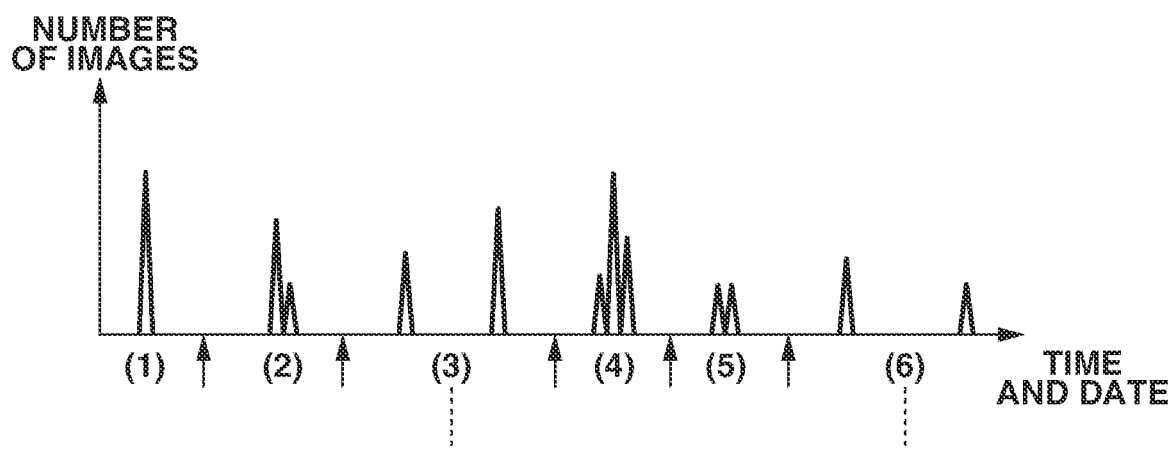

In step S417, the double-page spread allocation unit 209 executes scene combination. The scene combination refers to the combination of divided scenes in the case where the number of divided scenes is greater than the number of double-page spreads of the album. FIG. 6C illustrates a result of execution of scene combination on the image groups illustrated in FIG. 6A. The combination is executed at the portions specified by dashed lines to reduce the number of divisions to six.

Criteria for the combination will be described below. The divisions in FIG. 6A are searched to find a division with a small number of images. In the present exemplary embodiment, two portions with a small number of images are determined to reduce the number of divisions from eight to six at the two portions. In FIG. 6A, the image group 8 has the smallest number of images, followed by the image groups 3 and 7. The image groups 3 and 7 have the same number of images. The image group 8 adjacent to the image group 7 is a combination target, so that the image group 3 is determined as a combination target. As a result, the image groups 8 and 3 are respectively combined.

First, the combination of the image group 3 will be described below. The time difference between the image group 3 and its previous image group (i.e., group 2), is compared with the time difference between the image group 3 and its subsequent image group (i.e., image group 4), and the time difference between the image group 3 and the image group 4 is smaller. Thus, the image group 3 is combined with the image group 4 as illustrated by a dashed portion in FIG. 6C. Next, the combination of the image group 8 will be described below. The image group 8 has no subsequent image group, so the image group 8 is combined with the previous image group, which is the image group 7, as illustrated by a dashed portion in FIG. 6C.

In step S418, the double-page spread allocation unit 209 executes double-page spread allocation. As a result of steps S414 to S417, the number of divided scenes is the same as the designated number of double-page spreads. The double-page spread allocation unit 209 respectively allocates the plurality of image groups to the double-page spreads so as to prevent a mixture of the plurality of image groups on any of the double-page spreads. More specifically, the double-page spread allocation unit 209 allocates the plurality of image groups in order of image capturing date/time, starting with allocation of the top image group to the top double-page spread.

In step S419, the image selection unit 210 selects an image to be laid out on a specific double-page spread from an image group corresponding to the specific double-page spread. An example in which four pieces of image data are selected from an image group allocated to a double-page spread will be described below with reference to FIGS. 9A to 9I.

A section from a start to an end in FIG. 9A indicates the time difference (image capturing period of division) between the image capturing date/time of the first image data and the image capturing date/time of the last image data of a division allocated to a double-page spread. A method of selecting the first image will be described below with reference to FIG. 9B. The template includes one main slot 1002. Therefore, image data for the main slot is selected as the first image. From the plurality of pieces of image data corresponding to the image capturing period of the division illustrated in FIG. 9B, image data with the highest score for the main slot which is given in step S412 is selected. For the second and subsequent images, image data for the sub-slots is selected.

In the present exemplary embodiment, the images are selected in such a way as to avoid a concentration on a part of the image capturing period of the division. A method of further division of the image capturing period of the division in the present exemplary embodiment will be described below. As illustrated in FIG. 9C, the image capturing period of the division is divided into two divisions. Next, as illustrated in FIG. 9D, the second image is selected from the image capturing period which is specified by a real line and from which the first image is not selected. From the plurality of pieces of image data corresponding to the image capturing period specified by the real line in FIG. 9D, image data with the highest score for the sub-slots is selected.

Next, as illustrated in FIG. 9E, the image capturing periods of the respective divisions in FIG. 9D are each divided into two divisions. Then, as illustrated in FIG. 9F, from the plurality of pieces of image data corresponding to the image capturing periods which are specified by a real line and from which the first and second images are not selected, image data with the highest score for the sub-slots is selected as the third image.

A case where no image data is selectable due to the absence of image data corresponding to an image capturing period of an image data selection target will be described below by describing the selection of the fourth image as an example. FIG. 9G illustrates an example in which there is no image data corresponding to an image capturing period which is marked with diagonal lines and from which no image data is selected when the fourth image is to be selected from the image capturing period. In this case, as illustrated in FIG. 9H, the image capturing periods of the respective divisions are each divided into two divisions. Next, as illustrated in FIG. 9I, from the plurality of pieces of image data corresponding to the image capturing periods which are specified by a real line and from which the first to third images are not selected, image data with the highest score for the sub-slots is selected as the fourth image.

Referring back to FIG. 4, in step S420, the image layout unit 212 determines an image layout. An example in which the template input unit 211 inputs templates in FIGS. 10A to 10Q to a double-page spread according to designated template information will be described below.

In the present exemplary embodiment, the number of slots in the input template is set to three. The orientations of the selected three images arranged according to image capturing date/time, either portrait or landscape, are as specified by the template in FIG. 10Q. In the present exemplary embodiment, image data 1005 is for the main slot, and image data 1006 and image data 1007 are for the sub-slots. In the present exemplary embodiment, image data of an older image capturing date/time is laid out on the upper left of a template, and an image of a newer image capturing date/time is laid out on the lower right of the template. In the case of the template in FIG. 10Q, the image data 1005 for the main slot has the newest image capturing date/time, so the templates in FIGS. 10I to 10L are determined as candidates. Further, the image data 1006, which is the older one of the images for the sub-slots, is a landscape image, and the image data 1007, which is the newer one of the images for the sub-slots, is a portrait image. Thus, the template in FIG. 10J is determined as the most suitable template for the selected three pieces of image data to determine the layout. In step S420, the images to be laid out, the template on which the images are to be laid out, and the slots of the template in which the images are to be laid out respectively are determined.

In step S421, the image correction unit 214 executes image correction. The image correction unit 214 executes image correction if information indicating that the image correction is on is input from the image correction condition input unit 213. In the image correction, for example, dodging correction (luminance correction), red-eye correction, and contrast correction are executed. On the other hand, the image correction unit 214 does not execute image correction if information indicating that the image correction is off is input from the image correction condition input unit 213.

The image correction is executable on, for example, size-converted image data with the short side of 1200 pixels and sRGB color space.

In step S422, the layout information output unit 215 creates layout information. The image layout unit 212 lays out on the respective slots of the template determined in step S420 the image data on which the image correction in step S421 is executed. At this time, the image layout unit 212 changes the size of the image data to be laid out according to size information about the slots and then lays out the resulting image data. Then, the layout information output unit 215 generates bitmap data in which the image data is laid out on the template as an output image.

In step S423, whether execution of steps S419 to S422 on all the double-page spreads is completed is determined. If it is determined that execution of steps S419 to S422 on all the double-page spreads is not completed (NO in step S423), the processing in step S419 and the subsequent steps are repeated. On the other hand, if it is determined that execution of steps S419 to S422 on all the double-page spreads is completed (YES in step S423), the automatic layout process illustrated in FIG. 4 is completed.

If the automatic layout process in FIG. 4 is completed, the layout information output unit 215 outputs to the display 105 the bitmap data (output image) which is generated in step S422 and in which the images are laid out on the template, and the display 105 displays the bitmap data.

Figure 11:
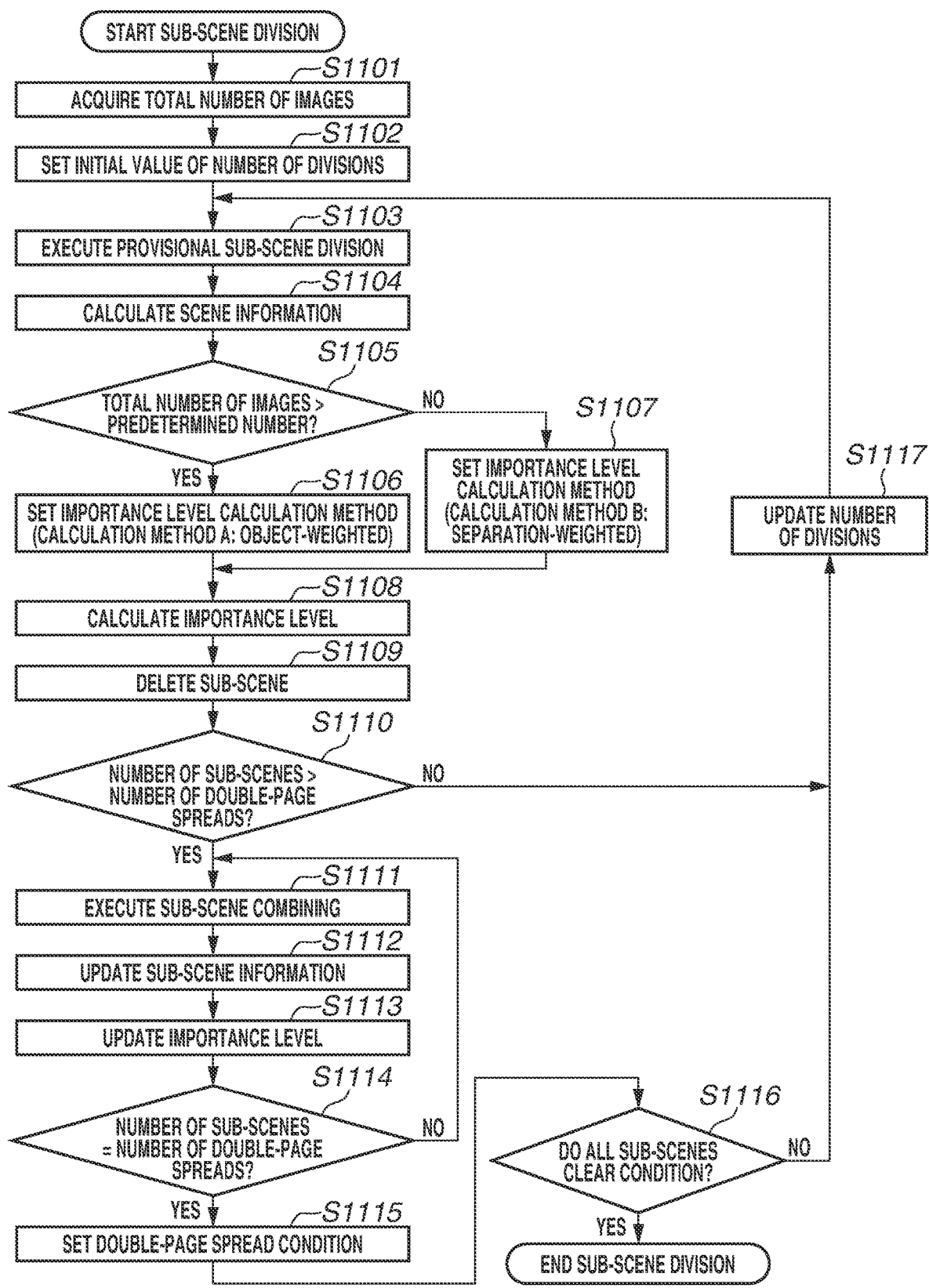
FIG. 11 is a flowchart illustrating a process of sub-scene division.

Details of the sub-scene division executed in step S416 in FIG. 4 will be described below. FIG. 11 is a flowchart illustrating details of the sub-scene division processing of the double-page spread allocation unit 209 of the album creation application in the present exemplary embodiment. The sub-scene division processing will be described below with reference to FIG. 11.

In step S1101, the double-page spread allocation unit 209 acquires the total number of images that are candidates to be laid out on the album. For example, information about the total number of images stored in the designated folder in the HDD 104, which is designated by the album creation condition designation unit 201, is acquired.

In step S1102, the double-page spread allocation unit 209 sets an initial value of the number of divisions N of sub-scenes. For example, the number of double-page spreads of the album input from the number-of-double-page-spreads input unit 208 is set as the initial value N. However, there are cases in which the number of divisions N of sub-scenes is greater than the number of double-page spreads as described below in the description of step S1117.

In step S1103, the double-page spread allocation unit 209 executes provisional sub-scene division such that the number of sub-scenes becomes the same as the number of divisions N. As to a method for the provisional sub-scene division, the image groups with a large number of images are divided using dates as a separator as described above in the description of step S416 in FIG. 4. If there are two image groups having the same number of images, the time difference between the image capturing date/time of the first image and the image capturing date/time of the last image is calculated for each of the two image groups, and the provisional division is executed on one of the image groups which has a larger time difference than the other.

In step S1104, the double-page spread allocation unit 209 calculates scene information including information about each of the currently-divided sub-scenes, and stores the calculated scene information in, for example, the RAM 103.

FIG. 12A illustrates an example of scene information in a case where the number of divisions N of sub-scenes is updated from ten, which is the number of double-page spreads as the initial value, to N=14 by the processing executed in step S1117 described below and provisional division is executed. Scene IDs are unique IDs (corresponding to the numerals from 1 to 14 in this example) of the respective divided sub-scenes.

The scene information in FIG. 12A includes the number of images in each sub-scene, the number of objects, importance level, and the image capturing period in each sub-scene. Further, the scene information also includes the time difference between the last image capturing time in the sub-scene and the first image capturing time in the sub-scene of the next scene ID on the list illustrated in FIG. 12. The number of images indicates the number of images included in each divided sub-scene. The number of objects indicates the total number of objects in the images included in each scene. The number of objects corresponds to, for example, the number of faces detected by the image analysis unit 204 in step S403 and the number of objects recognized in step S405 for each object type. The "time period" included in the scene information is the image capturing period of the images included in each divided sub-scene of the image group (scene) and indicates the time difference between the image capturing date/time of the first image and the image capturing date/time of the last image when the pieces of image data are arranged in the order of image capturing time. The "time difference" included in the scene information is the time difference between the divided sub-scenes and indicates the image capturing interval between the image capturing date/time of the last image of the target scene and the image capturing date/time of the first image of the next scene when the pieces of image data are arranged in the order of image capturing time. The "deletion target" and "scene combination ID" in FIG. 12A will be described below.

In step S1105, the double-page spread allocation unit 209 determines whether the total number of images acquired in step S1101 is not less than a predetermined number. If the total number of images is not less than the predetermined number (YES in step S1105), the processing proceeds to step S1106. On the other hand, if the total number of images is less than the predetermined number (NO in step S1105), the processing proceeds to step S1107.

In step S1106, the double-page spread allocation unit 209 sets an importance level calculation method in such a manner that the object (person, pet, or flower) in the scene information is weighted in the calculation of importance level of each sub-scene. On the other hand, in step S1107, the double-page spread allocation unit 209 sets an importance level calculation method in such a manner that an item regarding separation is weighted in the calculation of importance level of each sub-scene. Hereinafter, the importance level calculation methods set in steps S1106 and S1107 will sometimes be referred to as calculation methods A and B, respectively. In step S1108, the double-page spread allocation unit 209 calculates the importance level of each sub-scene based on the importance level calculation method set in step S1106 or S1107 and stores the calculated importance level in the RAM 103 as the "importance level" of the scene information in FIG. 12. The sub-scene that has a low importance level calculated in step S1108 is more likely to be a deletion target or combination target in the processing in step S1109 and subsequent steps described below.

The importance level calculation method setting processing and the importance level calculation processing using the set calculation method in steps S1106 to S1108 will be described in detail below.

The calculation by the calculation method A set in step S1106 is as expressed by formula (5) below.

(Scene importance level)=(days of the time difference)×24+(time of the time difference)+(the number of images including the object in the scene)×α+(the number of images including no object in the scene)×β  (5).

The value α is greater than the value β, and a desired value is set as the value α. For example, when α=10 and β=1, the "number of images including object" contributes to the scene importance level ten times the "number of images not including object".

The calculation by the calculation method B set in step S1107 is as expressed by formula (6) below.

(Scene importance level)=(days of the time difference)×24+(time of the time difference)+the number of images in the scene  (6).

As described above, in either one of the calculation methods A and B, the double-page spread allocation unit 209 calculates the scene importance level based on the time difference between sub-scenes that are adjacent in chronological order of image capturing date/time and the number of images in the sub-scenes. More specifically, the larger the time difference between adjacent sub-scenes is, the higher the possibility of facing a different image capturing situation from that of the adjacent sub-scene becomes, so that the scene importance level becomes high. Further, the larger the number of images included in the sub-scene is, the more important the image capturing situation is for the image capturing person, so that the importance level becomes high. On the other hand, the smaller the number of images in the sub-scene is, and the smaller the time difference between the adjacent sub-scenes is, the lower the scene importance level becomes.

The calculation method A expressed by formula (5) is different from the calculation method B expressed by formula (6) in that whether the object is contained in the image is taken into consideration. Therefore, in the calculation method A, "whether the object is included in the image" is reflected in the scene importance level in addition to the "time difference" (time difference between scenes) and the "number of images" included in the scene information in FIG. 12.

On the other hand, in the calculation method B, the "time difference" (time difference between scenes) and the "number of images" included in the scene information in FIG. 12 are reflected in the scene importance level, but "whether the object is included in the image" is not reflected in the scene importance level.

Thus, the calculation method A can be said to be an importance level calculation method in which the object is weighted higher, compared to the calculation method B. On the other hand, the calculation method B can be said to be an importance level calculation method in which the time difference (separation) between the scenes rather than whether the object is included in the image is weighted, compared to the calculation method A.

While the calculation method B is described as a calculation method in which whether the object is included in the image is not reflected in the importance level, the calculation method B is not limited to the above-described method and, for example, formula (5) described above can be used in the calculation method B. However, the value α is set smaller than the value α in the case of the calculation method A. Even in this case, the calculation method B is an importance level calculation method in which the time difference between the scenes rather than whether the object is included in the image is highly weighted, compared to the calculation method A.

Further, in the calculation of importance level by the calculation method A, the importance level of the image may be set differently depending on the type of the object included in the image. In the subject person setting in step S410 and the priority mode setting in step S411 in FIG. 4, a high importance level is set to the image that includes the person set as the subject person or the subject (object) of the type set as the priority mode setting. Then, the importance level of the image is reflected in the scene importance level.

For example, an importance level of "5" is set to the image data that includes the person set as the subject person and the image (referred to as "image A") that includes the object of the type to be prioritized, and an importance level of "10" is set to the image (referred to as "image B") that includes both the person set as the subject person and the object of the type to be prioritized. Further, an importance level of "1" is set to the image (referred to as "image C") that includes a person who is not the subject person or an object of the type not to be prioritized. Further, an importance level of "0" is set to the image (referred to as "image D") that includes no object.

In the calculation of the scene importance level by the calculation method A, formula (7) below may be used in place of formula (5).

(Scene importance level)=α×{(days of the time difference)×24+(time of the time difference)}+β×{(number of images A in the scene)×5+(number of images B in the scene)×10+(number of images C in the scene)×1}  (7).

Various methods can be employed as a method by which the user designates the scene importance level judgement criteria as described above. For example, the importance level may be calculated with a slider bar for each object type, which is a priority mode designation slider (not illustrated). The slider bars for person, pet, and flower are displayed as the slider bars for the respective object types, and the user can designate the respective setting values of the slider bars in three scales of "high", "standard", and "low". For example, if the person is set to "standard", the pet to "high", and the flower to "low", an importance level of "5" is set to the image data that includes the person, and an importance level of "10" is set to the image data that includes the pet. Further, an importance level of "15" is set to the image data that includes both the person and the pet, and an importance level of "1" is set to the image data that includes an object other than the person and the pet. Then, the scene importance level is calculated by a similar method to formula (7) and stored as scene information.

Further, the importance level can be calculated based on the number of persons derived from the number of faces of persons. An importance level of "5" is set to the image data including the number of persons that is at least one or more, and an importance level of "1" is set to the image data including the number of persons that is zero. Then, the scene importance level is calculated by a similar method to formula (7) and stored as scene information. In this way, the scene that includes more pieces of image data including more faces is judged to be a more important scene.

Further, the importance level can be calculated with a slider bar for each personal ID, which is a subject person setting slider (not illustrated). With the slider bar for each personal ID, the user can designate the respective setting values in three scales of "high", "standard", and "low". For example, if personal IDs 1, 2, and 3 are set to "standard", "high", and "low", respectively, an importance level of "5" is set to the image data that includes the person of the personal ID 1, and an importance level of "10" is set to the image data that includes the person of the personal ID 2. Further, an importance level of "15" is set to the image data that includes both the person of the personal ID 1 and the person of the personal ID 2, and an importance level of "1" is set to the image data that includes the person of the personal ID 3 or a person other than the persons of the personal IDs 1, 2, and 3. Then, the scene importance level is calculated by a similar method to formula (7) and stored as scene information. In this way, the scene that includes more pieces of image data including the person of the personal ID 1 than image data including the person of the personal ID 3 or a person other than the persons of the personal IDs 1, 2, and 3 and more pieces of image data including the person of the personal ID 2 than image data including the person of the personal ID 1 is judged to be a more important scene.

As described above, if the total number of images to be candidates to be laid out on the electronic album is more than a predetermined number, the sub-scene importance level is calculated by the calculation method A in which whether the object is included in the image is weighted. More specifically, the scene that includes more pieces of image data including more subject persons and/or prioritized objects is judged to be a more important scene. Then, the scene judged to be important is more likely to be further divided into sub-scenes to be allocated to many double-page spreads and is more likely to be combined with a sub-scene judged to be unimportant by the processing executed in steps S1108 to S1117 described below. Accordingly, the importance level is judged by the calculation method A so that the images including the object are more likely to be laid out on many double-page spreads.

However, if the calculation method A is used also in a case where the total number of images to be candidates to be laid out on the electronic album is less than the predetermined number, execution of sub-scene combination as appropriate may be difficult. In a case where the total number of images to be candidates to be laid out is small, the number of images included in each sub-scene is more likely to be small. Thus, even if there is a sub-scene (e.g., sub-scene corresponding to the image capturing situation in which the person is captured) that includes more images including the object than the other sub-scenes, the number of images included in the sub-scene is likely to be small.

At this time, if the importance level is calculated by the calculation method A in which the object is highly weighted, the sub-scene with a small number of images is likely to be further divided into scenes to be allocated to many double-page spreads and, furthermore, is likely to be combined with a sub-scene judged unimportant (sub-scene of an image of scenery, etc.). Thus, the sub-scene originally with a small number of images is further divided and allocated to the plurality of double-page spreads, so that the number of images to be allocated to one double-page spread is further decreased. Thus, the number of object-including images to be laid out on one double-page spread decreases, whereas many images including no object can be laid out on one double-page spread. Further, the sub-scene combination results in double-page spreads including a mixture of images including the object and images not including the object. Thus, the electronic album includes, for example, many double-page spread pages on which only one image including the person is laid out and double-page spread pages including a mixture of person and scenery, so that a desired result of an entire balance of the electronic album may not be obtained.

Thus, in the present exemplary embodiment, if the total number of images to be a candidate to be laid out on the electronic album is less than the predetermined number (NO in step S1105), the scene importance level is calculated by the calculation method B (steps S1107 and S1108). As described above, the calculation method B is an importance level calculation method in which the time difference between the scenes rather than whether the object is included in the image is highly weighted, compared to the calculation method A. Therefore, in a case where the total number of images to be candidates to be laid out on the album is small, the object-weighted scene division is executed to reduce inappropriate layouts as described above.

The processing executed in step S1109 and the subsequent steps will be described below. The case where the object-weighted importance level calculation method (calculation method A) is set (YES in step S1105) will be described as an example.

In step S1109, the double-page spread allocation unit 209 deletes from the scene information a sub-scene that satisfies a predetermined deletion condition. In the present exemplary embodiment, the condition that the "importance level" of the scene information is zero is set as the condition for exclusion from the allocation to the double-page spreads. For example, the importance level of the scene ID "11" in FIG. 12A is zero. Thus, the scene ID "11" satisfies the condition and is therefore determined as a deletion target scene. In a case where formula (7) described above is used as the calculation method A in the present exemplary embodiment, as described above, the user designates the priority mode so that an important object type is identified. Then, if an image group includes an image including a subject of the object type, the importance level of the image group is not set to zero. Therefore, the image including the subject of the important object type is not deleted. Alternatively, the deletion condition can be set in such a manner that the sub-scene is deleted if the importance level is not higher than a given value which is one or more.

In step S1110, the double-page spread allocation unit 209 judges whether the number of sub-scenes is more than the number of double-page spreads. If the number of sub-scenes is more than the number of double-page spreads (YES in step S1110), the processing proceeds to step S1111, and the sub-scenes are combined (joined). On the other hand, if the number of sub-scenes is not more than the number of double-page spreads (NO in step S1110), the processing proceeds to step S1117.

In step S1111, the double-page spread allocation unit 209 executes sub-scene combination. In the present exemplary embodiment, the designation number of double-page spreads is, for example, ten. As illustrated in FIG. 12A, the combination is executed on the remaining 13 sub-scenes excluding the deletion target of the scene ID "11". In the present exemplary embodiment, the sub-scene that has a low importance level is prioritized as a combination target. More specifically, the sub-scene having the lowest importance level other than the deletion target sub-scene is determined as a scene combination target. Further, as to the sub-scene combination method, while the scene combination executed according to the number of images in each sub-scene in step S417 in FIG. 4 is described above, a combination method using the scene information about each sub-scene will be described below.

In the scene information in FIG. 12A, the scene having the second lowest importance level after the deleted scene ID "11" is the scene of the scene ID "8". From the scenes of the scene IDs "7" and "9" which are adjacent in chronological order of image capturing date/time of the images to the scene of the scene ID "8", the scene of the scene ID "7" having a smaller time difference is combined with the scene of the scene ID "8". As a result of the combination, the number of scenes becomes 12.

In step S1112, the double-page spread allocation unit 209 recalculates sub-scene information based on the combined sub-scene. As to the number of images, the number of images corresponding to the scene ID "8" is added to the number of images corresponding to the scene ID "7". As to the number of objects, the number of objects corresponding to the scene ID "8" is added to the number of objects corresponding to the scene ID "7". As to the time period, the time period corresponding to the scene ID "8" is added to the time period corresponding to the scene ID "7". As to the time difference, the time difference corresponding to the scene ID "7" is updated with the time difference corresponding to the scene ID "8".

In step S1113, the double-page spread allocation unit 209 recalculates the importance level for each sub-scene based on the information recalculated in step S1112 based on the combined sub-scene. In the present exemplary embodiment, the importance level of the scene to be combined is added. In a case where the scene of the scene ID "8" is combined with the scene of the scene ID "7", the importance level corresponding to the scene ID "8" is added to the importance level corresponding to the scene ID "7". As to an importance level calculation method, the importance level of each sub-scene may be re-calculated from the scene information updated in step S1112 by the calculation method used in step S1108 (object-weighted calculation method A or time-period-weighted calculation method B).

In step S1114, the double-page spread allocation unit 209 judges whether the number of sub-scenes is the same number as the number of double-page spreads. If the double-page spread allocation unit 209 judges that the number of sub-scenes is the same number as the number of double-page spreads (YES in step S1114), the processing proceeds to step S1115. On the other hand, if the double-page spread allocation unit 209 judges that the number of sub-scenes is not the same number as the number of double-page spreads (NO in step S1114), the processing returns to step S1111, and the sub-scene combination processing and the subsequent processing (steps S1111 to S1113) are repeated until the number of scenes becomes the same as the number of double-page spreads.

The field of scene combination ID in FIG. 12A illustrates a plurality of sub-scenes to be combined by scene combination. In FIG. 12A, for example, two scenes of the scene IDs "2" and "3" are illustrated as sub-scenes to be combined as the scene combination ID "2". FIG. 12B illustrates a result of processing executed in steps S1112 and S1113. As illustrated in FIG. 12B, the plurality of scenes to which the same ID is given as the scene combination ID in FIG. 12A are combined, and a new scene ID is given to the combined scene.

In step S1115, the double-page spread allocation unit 209 sets a condition for judging whether each of the sub-scenes can constitute the double-page spreads. Specifically, the importance level of each sub-scene or a threshold value for other items of the scene information is set. The condition set in step S1115 is used in the judgement processing in step S1116 described below. In the present exemplary embodiment, the condition for the judgment in step S1116 is, for example, as follows. Specifically, as to the scene information regarding each sub-scene, the number of images of 10 or more, the number of objects of 10 or more, the importance level of 20 or more, the time period of 1.5 hours or longer, and the time difference of 12 hours or longer are determined as the condition for being an important scene. In step S1115, the threshold value is set to each item of the scene information.

In step S1116, the double-page spread allocation unit 209 judges whether each of the sub-scenes satisfies the condition of the scene information for being an important scene. The condition set in step S1115 is used as a condition of the judgement. More specifically, the double-page spread allocation unit 209 evaluates each sub-scene using the importance level of the sub-scene or the other items of the scene information and judges whether the evaluation satisfies the predetermined condition. If all the sub-scenes satisfied the set condition (YES in step S1116), the process is ended. On the other hand, if not all the sub-scenes satisfies the set condition (NO in step S1116), the processing proceeds to step S1117. By the processing in steps S1114 and S1116, a plurality of sub-scenes the number of which is the same as the number of double-page spreads (YES in step S1114) and all of which are important (YES in step S1116) is determined.

As to a method of judging whether a scene is an important scene, in the present exemplary embodiment, the double-page spread allocation unit 209 evaluates the scene using the scene information corresponding to the judgement target scene and judges whether the scene is an important scene. More specifically, the number of objects to be the subject person is taken into consideration and, further, the number of images in the scene and the image capturing period are taken into consideration. Thus, for example, usual scenes which include many images including many subject persons as an image capturing target and trip scenes which have a long image capturing period and a high image capturing frequency are judged as an important image group (scene). As a result, the scenes are more likely to remain in the double-page spreads as scenes that are good enough to constitute the double-page spreads. On the other hand, scenes including less subject persons and objects and scenes having a short image capturing period and a low image capturing frequency are judged as an unimportant scene and are likely to be deleted.

In step S1117, the double-page spread allocation unit 209 sets the number of divisions N=N+1, where N is the number of divisions of sub-scenes. More specifically, in step S1105, the double-page spread allocation unit 209 changes the number of divisions, and steps S1103 to S1109 are executed again, and then the judgement is executed again in step S1110. Further, if it is judged that the number of sub-scenes is more than the number of double-page spreads in step S1110 (YES in step S1110), steps S1111 to S1115 are executed, and the judgement processing is executed in step S1116. However, there are cases where the division and combination are repeated endlessly and the change of the number of divisions cannot be ended, so that an upper limit is set to the number of divisions N. Whether the upper limit of the number of divisions N is reached is judged, and if it is judged that the upper limit is reached, the resetting of the number of divisions N is not conducted, and the process illustrated in FIG. 11 is ended.

By the process illustrated in FIG. 11, the plurality of sub-scenes the number of which is the same as the number of double-page spreads (YES in step S1114) and all of which are important (YES in step S1116) is determined. In the example illustrated in FIG. 12B, every one of the ten sub-scenes satisfies the condition described above as an example of the condition set in step S1115. Thus, in step S1104, the double-page spread allocation unit 209 judges that the scene information about each sub-scene satisfies the condition for being an important scene, and the process illustrated in FIG. 11 is completed. In other words, if the double-page spread allocation unit 209 judges that every one of the plurality of scenes (plurality of image groups) satisfies the condition for being an important scene, the double-page spread allocation unit 209 determines the plurality of scenes (plurality of image groups) as candidates to be laid out on the template of the designated number of double-page spreads.

Further, in the present exemplary embodiment, if the total number of images to be candidates that are laid out on the electronic album is less than the predetermined number (NO in step S1105), the scene importance level is calculated by the calculation method B (steps S1107 and S1108). As described above, the calculation method B is an importance level calculation method in which the time difference between the scenes rather than whether the object is included in the image is highly weighted, compared to the calculation method A. Therefore, in the case where the total number of candidate images to be laid out on the album is smaller, inappropriate layout due to a small number of images including the object in a sub-scene is reduced. The scene combination in the case where the total number of images to be candidates to be laid out is less than the predetermined number will be described below with reference to FIGS. 12C and 12D.

In FIG. 12C, candidate images to be laid out on the electronic album are the same as those in FIG. 12A, and in step S1103, provisional division into sub-scenes is executed as in FIG. 12A. However, FIG. 12C is different from FIG. 12A in that the scene importance level is different from that in FIG. 12A because the scene importance level is calculated by formula (6) corresponding to the calculation method B.

If the scene combination is executed in step S1111 in FIG. 11, a plurality of scenes to be a scene combination target is set as specified by the scene combination ID in FIG. 12C. For example, in FIG. 12C, the scenes of the scene IDs "2" and "3" are sub-scenes to be combined into the scene of the scene combination ID "2".

Further, in FIG. 12A, the scene of the scene ID "9" is combined with the scene of the scene ID "10". On the other hand, in FIG. 12C, the scene of the scene ID "9" is not combined because the time difference between the scene of the scene ID "9" and the scene of the scene ID "10" is large. Thus, while the scene of the scene ID "9" is a combination target in the calculation method A because the number of images including the object is highly weighted, the scene of the scene ID "9" is not a combination target in the calculation method B because the time difference is highly weighted.

FIG. 12D illustrates a result of scene combination executed by the processing in steps S1111 to S1114. As illustrated in FIG. 12D, the scenes are combined, and the scene combination ID in FIG. 12C becomes the scene ID in FIG. 12D. For example, the scene IDs "6", "7", and "8" are combined as the scene combination ID "5". Further, the scene IDs "10" and "11" are combined as the scene combination ID "7".

Further, in step S1115, the double-page spread allocation unit 209 sets, as a condition for judging whether each of the sub-scenes can constitute the double-page spreads, a different condition from the condition used in a case where the calculation method A is used. In the present exemplary embodiment, the judgement condition is, for example, as follows. Specifically, as the scene information about each sub-scene, the number of images of 10 or more, the importance level of 100 or more, the time period of 1.5 hours or longer, and the time difference of 12 hours or longer are set as the condition for being an important scene. As a result, while the number of objects is included in the condition in a case where the calculation method A is used, the number of objects is not included in the condition in a case where the calculation method B is used. Further, for example, the calculated value of the importance level may differ significantly from the scene importance level calculated by formula (6) depending on the values α and β of formula (5). Thus, different values are set for the respective importance level calculation methods as the threshold value of the importance level included in the condition set in step S1115.

As described above, in the present exemplary embodiment, the scene information of every one of the sub-scenes satisfies the condition for being an important scene at the time when the sub-scene division processing is completed. In other words, all the sub-scenes can be determined as an important scene at the time when the sub-scene division processing is completed. Further, as described above, the number of divided scenes is the same as the designated number of double-page spreads, so that the double-page spreads are respectively associated with the sub-scenes in step S416 in FIG. 4. As a result, the scenes judged to be important are likely to remain in the double-page spreads as scenes that are good enough to constitute the double-page spreads, and dropout of an important scene is prevented.

In step S1106, if the object-weighted scene importance level calculation method is set, scene division is executed so that more double-page spreads include object-containing images. Thus, when the divided sub-scenes are allocated to the respective double-page spreads, the album is created with the object laid out on each double-page spread.

On the other hand, if the separation-weighted scene importance level calculation method is set in step S1107, scene division is executed to reduce the connection between the sub-scenes. Thus, when the divided sub-scenes are allocated to the respective double-page spreads, the album is created with appropriate separation between the double-page spreads.

According to the present exemplary embodiment, at least two image groups among the plurality of image groups are combined according to the importance levels of the plurality of provisionally-divided image groups. In the importance level judgement, the method of judging the importance level of the image groups is dynamically changed according to the total number of layout target candidate images.

For example, in a case where the total number of layout target candidate images is large, even if the image groups are provisionally divided into a predetermined number of image groups according to the image capturing date/time, various images are more likely to exist in each image group. Thus, even if the importance level of each image group is judged based on a predetermined image feature (e.g., object feature), the effect on the importance level of the image group is relatively small.

On the other hand, in a case where the total number of layout target candidate images is small, if the image groups are provisionally divided into a predetermined number of image groups according to the image capturing date/time, an image group (e.g., image group of images including the person) can include more images having the predetermined feature than the other image groups. Further, if the image feature is taken into consideration in addition to the image capturing date/time, the importance level of the image group becomes high, and the image group originally having a small number of images is further divided and laid out on the plurality of double-page spreads. This may result in inappropriate layout, e.g., there are many pages on which only one image including the person is laid out on one double-page spread.

In the present exemplary embodiment, the method of judging the importance level of the image group is dynamically changed according to the number of layout target candidate images as described, so that the importance level of the image group is judged as appropriate. More specifically, in a case where the number of layout target candidate images is small, the importance level of the image group is judged without using or highly weighting the predetermined image feature (e.g., object feature). Thus, the plurality of images is divided into a plurality of image groups as appropriate, and the plurality of image groups is allocated as appropriate to the plurality of double-page spreads. As a result, a layout result desirable for the user can be provided.

Further, in the present exemplary embodiment, as described above, the important object type is identified based on the priority mode designated by the user, and a high importance level is set to the image group that includes images including the subject of the object type. Thus, according to the present exemplary embodiment, the priority mode designated by the user, i.e., the subject designated by the user as an important object type is more likely to be included in every one of the divided image groups. This reduces a situation in which the image group includes no image or a few images including the subject of the type that the user considers important.

In the above-described exemplary embodiment, a high importance level is given to an image including an object of an object type designated by the user, as a method by which as many images including a subject of the object type as possible are included in each of a plurality of image groups to which images in the folder designated by the user are divided.

The method is not limited to the above-described method and, for example, the condition that a predetermined number or more of images including the subject of the object type designated by the user are included may be set as the condition for being an important image group (scene) in the judgement in step S1104. In this way, for example, if the predetermined number is set to one, at least one image including the subject (important object) of the object type designated by the user is included in each of the plurality of image groups to which the images in the folder designated by the user are divided.

Further, even if at least one image including the important object is included in each of the plurality of image groups in the exemplary embodiment, the image is not always selected in the image selection in step S419. Thus, the condition that at least one image including the important object may be set as a condition of the selection in step S419.

Further, the process illustrated in FIG. 11 may be executed also in the scene combination processing in step S417. In this case, the initial value of the number of divisions N of sub-scenes is set larger than the number of scenes divided in step S407, i.e., the number of double-page spreads. Thus, when step S1101 is executed for the first time, the sub-scene division is not executed.

Further, if image data includes an image cut out from moving image data, the number of image data may increases, and the importance level of the scene may increase. Therefore, an identifier for identifying whether image data is moving image data is acquired, and the importance level corresponding to the number of images cut out from the moving image may be reduced from the importance level of the scene. For example, "0.1" is set in a case of image data cut out from a moving image, and "1" is set in a case of image data that is not cut out from a moving image. Then, a total value is calculated by adding the importance levels of the respective pieces of image data. In this way, a scene including many pieces of image data cut out from a moving image is prevented from being erroneously judged as an important scene.

In the above-described exemplary embodiment, the total number of layout target images is judged (step S1105 in FIG. 11) in the scene division in step S416 in FIG. 4, and the method of judging the importance level of the image group is dynamically changed based on the total number. The method is not limited to the above-described method and, for example, the total number of layout target images is judged when the process illustrated in FIG. 4 is started, and if the total number is not greater than a predetermined value, steps S401 to S417 can be skipped. In this case, a plurality of images which is layout target candidates may be divided into the same number of image groups as the number of double-page spreads based on the time information about the images without using the feature amounts of the images. In other words, instead of changing the method of judging the importance level of the image group according to the total number of layout target images, the method of division into the image groups may be changed according to the total number of layout target images.

In the first exemplary embodiment, the scene information is described as including the number of images in each sub-scene, the number of objects, importance level, time period, and time difference, and the scene information is used in the judgement in step S1104. In a second exemplary embodiment, in step S1104, the judgement may be executed using character information about image data as a condition. For example, if character information can be acquired from captured image data of a scene, the character information is held as scene information. Then, in step S1104, whether the character information about the captured scene is character information indicating the name of a specific place, such as a tourist spot, or whether the character information indicates a favorite word of the user is judged. Then, if it is judged that the character information indicates the name of a specific place or that the character information matches the favorite word of the user, the double-page spread allocation unit 209 judges that the scene is an important scene.

Further, if personal information can be acquired from image data, the personal information is held as scene information. Examples of personal information include the name and address. In a case where it is considered that information that identifies an individual person, such as a name and an address, is not suitable for use as image data to be laid out on the double-page spreads, if the percentage of image data of that type with respect to the number of pieces of image data of each scene is not lower than a predetermined threshold value, the scene is judged an unimportant scene. For example, in step S1104, the double-page spread allocation unit 209 may set the "importance level" of a scene to zero if 100% of the scene is image data other than the double-page spread layout target, so that the scene is determined as a deletion target in step S1102.

While the character information and personal information acquired from image data are used as a judgement condition in step S1104, the information is not limited to the above-described examples and may be any information that can be acquired from the image data, and the information may be used as a judgement condition in step S1104.

In the above-described exemplary embodiments, the plurality of images in the folder designated by the user is divided into a plurality of scenes (image groups), and the processing is executed so that the number of double-page spreads becomes the same as the number of image groups. The method is not limited to the above-described methods and, for example, whether the condition (judgement condition in step S1104) as an image group is satisfied may be judged with respect to the plurality of images in chronological order of image capturing date/time from the newest or oldest image. Then, when the number of image groups satisfying the condition reaches the number of double-page spreads, the image group determination processing may be ended. In this case, the condition that the image group includes the image including the important object may be set as the condition described above.

Further, in the above-described exemplary embodiments, the division method in which the object in the images is highly weighted or the division method in which the time difference between the plurality of image groups is highly weighted is selected as the method of dividing the plurality of layout target candidate images into the plurality of image groups. Further, the number of layout target candidate images is used as a condition of the selection. The selection condition of the division method is not limited to the above-described condition and, for example, the object-weighted division method or the time-difference-weighted division method may be selected according to a user instruction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-016209, filed Jan. 31, 2017, which is hereby incorporated by reference herein in its entirety.

What is claimed is:

1. An image processing method comprising:
   dividing a plurality of images into a plurality of image groups according to time information corresponding to the plurality of images, the plurality of images being candidates to be laid out on a template; and
   laying out at least one image included in each of the plurality of divided image groups on the template corresponding to each of the plurality of divided image groups,
   wherein, in the dividing, (1) a predetermined first method in which the dividing is executed based on a predetermined feature of the images included in the plurality of images in addition to the time information or (2) a predetermined second method in which a weight of the predetermined feature in the dividing is lower than a weight in the predetermined first method, is selected based on a predetermined condition about the number of images included in the plurality of images, as a method of dividing the plurality of images into the plurality of image groups,
   wherein in a case where the number of images included in the plurality of images is larger than a predetermined number, the first method is selected, and in a case where the number of images included in the plurality of images is not larger than the predetermined number, the second method is selected, and
   wherein the dividing is executed by the selected division method.

2. The image processing method according to claim 1, wherein the dividing includes:
   provisionally dividing the plurality of images into a plurality of first image groups more than two, according to the time information corresponding to the plurality of images;
   judging an importance level of each of the plurality of provisionally divided first image groups; and
   determining as the plurality of divided image groups a plurality of second image groups obtained by combining at least two of the plurality of first image groups so that a first image group the judged importance level of which is low is preferentially set as a combination target,
   wherein in the judging, the importance level is judged by a method that differs according to whether the number of images included in the plurality of images is larger than a predetermined number.

3. The image processing method according to claim 1, wherein the predetermined feature is not used in the second method.

4. The image processing method according to claim 1, wherein the predetermined feature is a feature about an object included in the plurality of images.

5. The image processing method according to claim 4, wherein the predetermined feature includes a feature that a predetermined object is included in the plurality of images.

6. The image processing method according to claim 1, comprising displaying, on a display, an image in which the at least one image included in each of the plurality of image groups is laid out on the template.

7. The image processing method according to claim 1, wherein in the laying out, at least one image included in each of the plurality of divided image groups is laid out on a page included in an album.

8. The image processing method according to claim 7, wherein the page is a double-page spread included in the album.

9. The image processing method according to claim 8, wherein in the dividing, the plurality of images are divided into the plurality of image groups of the number of double-page spreads included in the album.

10. An image processing method comprising:
dividing a plurality of images into a plurality of image groups according to time information corresponding to the plurality of images, the plurality of images being candidates to be laid out on a template; and
laying out at least one image included in each of the plurality of divided image groups on the template corresponding to each of the plurality of divided image groups,
wherein, in the dividing, (1) a predetermined first method in which the dividing is executed based on a predetermined feature of the images included in the plurality of images in addition to the time information or (2) a predetermined second method in which a weight of the predetermined feature in the dividing is lower than a weight in the predetermined first method, is selected based on a predetermined condition, as a method of dividing the plurality of images into the plurality of image groups, and
wherein the dividing is executed by the selected division method,
wherein in the laying out, in a case where it is determined that the plurality of image groups satisfies a predetermined criterion, layout processing is executed to lay out on the template at least one image included in each of the plurality of image groups, and in a case where it is determined that the plurality of image groups does not satisfy the predetermined criterion, the layout processing is not executed, and
wherein the predetermined criterion differs according to whether the predetermined condition is satisfied.

11. The image processing method according to claim 10, wherein the predetermined condition is a condition about the number of images included in the plurality of images, and
wherein in a case where the number of images included in the plurality of images is larger than a predetermined number, the first method is selected, and in a case where the number of images included in the plurality of images is not larger than the predetermined number, the second method is selected.

12. The image processing method according to claim 10, wherein the predetermined criterion is a criterion about at least one of a number of images included in each of the plurality of image groups, a number of objects included in each of the plurality of image groups, an image capturing period in each of the plurality of image groups, and a time difference in image capturing date/time between the plurality of image groups.

13. The image processing method according to claim 12, wherein in a case where it is determined that the predetermined condition is satisfied, the predetermined criterion includes a criterion about the predetermined feature, and in a case where it is determined that the predetermined condition is not satisfied, the predetermined criterion does not include the criterion about the predetermined feature.

14. The image processing method according to claim 12, wherein in a case where it is determined that the predetermined condition is not satisfied, the predetermined criterion includes a condition about the time difference.

15. A non-transitory storage medium storing a program for causing a computer to execute an image processing method, the image processing method comprising:
dividing a plurality of images into a plurality of image groups according to time information corresponding to the plurality of images, the plurality of images being candidates to be laid out on a template; and
laying out at least one image included in each of the plurality of divided image groups on the template corresponding to each of the plurality of divided image groups,
wherein, in the dividing, (1) a predetermined first method in which the plurality of images are divided into the plurality of image groups based on a predetermined feature of the images included in the plurality of images in addition to the time information or (2) a predetermined second method in which a weight of the predetermined feature in the dividing is lower than a weight in the predetermined first method, is selected based on a predetermined condition about the number of images included in the plurality of images, as a method of dividing the plurality of images into the plurality of image groups,
wherein in a case where the number of images included in the plurality of images is larger than a predetermined number, the first method is selected, and in a case where the number of images included in the plurality of images is not larger than the predetermined number, the second method is selected, and
wherein the plurality of images are divided into the plurality of image groups by the selected division method.

16. An image processing apparatus comprising:
at least one processor;
wherein the at least one processor functions as:
a division unit configured to divide a plurality of images into a plurality of image groups according to time information corresponding to the plurality of images, the plurality of images being candidates to be laid out on a template; and
a layout unit configured to lay out at least one image included in each of the plurality of image groups divided by the division unit on the template corresponding to each of the plurality of image groups,
wherein the division unit selects (1) a predetermined first method in which the division is executed based on a predetermined feature of the images included in the plurality of images in addition to the time information or (2) a predetermined second method in which a weight of the predetermined feature in the dividing is lower than a weight in the predetermined first method, is selected based on a predetermined condition about the number of images included in the plurality of images, as a method of dividing the plurality of images into the plurality of image groups,
wherein in a case where the number of images included in the plurality of images is larger than a predetermined number, the first method is selected, and in a case where the number of images included in the plurality of images is not larger than the predetermined number, the second method is selected, and
the division is executed by the selected division method.

17. The image processing apparatus according to claim 16,
wherein the division unit includes:
a provisional division unit configured to provisionally divide the plurality of images into a plurality of first image groups more than two, according to the time information corresponding to the plurality of images;
a judgement unit configured to judge an importance level of each of the plurality of first image groups that is provisionally divided by the provisional division unit; and
a determination unit configured to determine, as the plurality of image groups divided by the division unit, a plurality of second image groups obtained by combination at least two of the plurality of first image groups such that the first image group the judged importance level of which is low is preferentially set as a combination target, and
wherein the judgement unit judges the importance level by a method which differs according to whether the number of images included in the plurality of images is larger than a predetermined number.

18. The image processing apparatus according to claim 16, wherein the predetermined feature is not used in the second method.

19. The image processing apparatus according to claim 16, wherein the predetermined feature is a feature about an object included in the plurality of images.

20. The image processing apparatus according to claim 19, wherein the predetermined feature includes a feature that a predetermined object is included in the plurality of images.

21. An image processing apparatus comprising:
at least one processor;
wherein the at least one processor functions as:
a division unit configured to divide a plurality of images into a plurality of image groups according to time information corresponding to the plurality of images, the plurality of images being candidates to be laid out on a template; and
a layout unit configured to lay out at least one image included in each of the plurality of divided image groups on the template corresponding to each of the plurality of divided image groups,
wherein, (1) a predetermined first method in which the dividing is executed based on a predetermined feature of the images included in the plurality of images in addition to the time information or (2) a predetermined second method in which a weight of the predetermined feature in the dividing is lower than a weight in the predetermined first method, is selected based on a predetermined condition, as a method of dividing the plurality of images into the plurality of image groups, and
wherein the dividing is executed by the selected division method,
wherein in a case where it is determined that the plurality of image groups satisfies a predetermined criterion, the layout unit executes layout processing to lay out on the template at least one image included in each of the plurality of image groups, and in a case where it is determined that the plurality of image groups does not satisfy the predetermined criterion, the layout unit does not execute the layout processing, and
wherein the predetermined criterion differs according to whether the predetermined condition is satisfied.

22. The image processing apparatus according to claim 21,
wherein the predetermined condition is a condition about the number of images included in the plurality of images, and
wherein in a case where the number of images included in the plurality of images is larger than a predetermined number, the first method is selected, and in a case where the number of images included in the plurality of images is not larger than the predetermined number, the second method is selected.

23. The image processing apparatus according to claim 21, wherein the predetermined criterion is a criterion about at least one of the number of images included in each of the plurality of image groups, the number of objects included in each of the plurality of image groups, an image capturing period in each of the plurality of image groups, and a time difference in image capturing date/time between the plurality of image groups.

* * * * *